(12) United States Patent
Ishikawa

(10) Patent No.: US 10,319,110 B2
(45) Date of Patent: Jun. 11, 2019

(54) DISPLAY CONTROL METHOD AND SYSTEM

(71) Applicant: FUJITSU LIMITED, Kawasaki-shi, Kanagawa (JP)

(72) Inventor: Hidenori Ishikawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 33 days.

(21) Appl. No.: 14/643,039

(22) Filed: Mar. 10, 2015

(65) Prior Publication Data

US 2015/0302623 A1    Oct. 22, 2015

(30) Foreign Application Priority Data

Apr. 16, 2014    (JP) ................. 2014-084878

(51) Int. Cl.
| | |
|---|---|
| *G06T 19/00* | (2011.01) |
| *G09G 5/14* | (2006.01) |
| *G06T 7/73* | (2017.01) |
| *G06K 9/20* | (2006.01) |
| *G06K 19/00* | (2006.01) |
| *G06F 3/01* | (2006.01) |

(Continued)

(52) U.S. Cl.
CPC ............ *G06T 7/74* (2017.01); *G06F 3/011* (2013.01); *G06F 3/0304* (2013.01); *G06K 9/2063* (2013.01); *G06K 19/00* (2013.01); *G06K 2009/363* (2013.01); *G06T 2207/30204* (2013.01)

(58) Field of Classification Search
CPC .......... G09G 5/14; G06T 19/00; G06T 19/006
USPC ........................................ 345/629, 632, 633
See application file for complete search history.

(56) References Cited

U.S. PATENT DOCUMENTS 8,542,906 B1 *   9/2013   Persson ............. G06K 9/00671
                                                       382/103
2009/0066725 A1 * 3/2009  Nogami ................. A63F 13/10
                                                       345/632

(Continued)

FOREIGN PATENT DOCUMENTS

| JP | 2012-48720 | 3/2012 |
|---|---|---|
| JP | 2012-103789 | 5/2012 |
| JP | 2012-178064 | 9/2012 |

OTHER PUBLICATIONS

Office Action dated Dec. 5, 2011 in Japanese Patent Application No. 2014-064878 (with English translation).

*Primary Examiner* — Yi Yang
(74) *Attorney, Agent, or Firm* — Xsensus LLP

(57) ABSTRACT

A system includes circuitry configured to detect a first object and a second object from a first image captured, generate positional relationship information between the first object and the second object, and distortion information regarding a second shape of the second object in the first image with reference to a first shape of the first object in the first image, store, into a memory, the positional relationship information and the distortion information associated with the second object, acquire a second image, and control a display to display a content associated with the second object based on the positional relationship information and the distortion information when the first object is detected from the second image and when the second object is not detected from the second image, the content data being superimposed on the second image at a specific position with respect to the second object.

20 Claims, 18 Drawing Sheets

(51) Int. Cl.
*G06F 3/03* (2006.01)
*G06K 9/36* (2006.01)

(56) References Cited

U.S. PATENT DOCUMENTS

| | | | |
|---|---|---|---|
| 2009/0245681 A1* | 10/2009 | Kobayashi | G06T 7/0018 |
| | | | 382/275 |
| 2011/0169861 A1* | 7/2011 | Suzuki | G06T 7/0046 |
| | | | 345/632 |
| 2012/0050305 A1 | 3/2012 | Song et al. | |
| 2013/0201217 A1 | 8/2013 | Morinaga et al. | |
| 2014/0125701 A1* | 5/2014 | Hayakawa | A63F 13/525 |
| | | | 345/633 |
| 2014/0225919 A1* | 8/2014 | Kaino | G06T 19/006 |
| | | | 345/633 |
| 2015/0130790 A1* | 5/2015 | Vasquez, II | G06T 19/006 |
| | | | 345/419 |

* cited by examiner

FIG. 7
| AR MARKER ID | AR MARKER PATTERN | AR MARKER SIZE INFORMATION |
|---|---|---|
| ARID 1 | 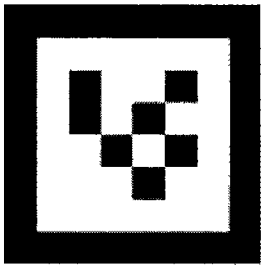 | Bs1 |
| ARID 2 | 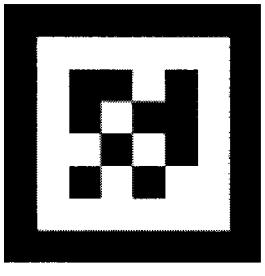 | Bs2 |
| ARID 3 | 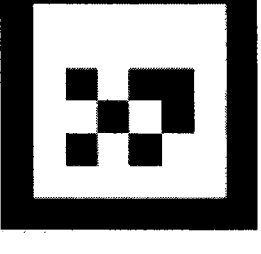 | Bs3 |

FIG. 8
| AR OBJECT ID | AR OBJECT | REFERENCE AR MARKER ID | RELATIVE COORDINATION FROM REFERENCE AR MARKER |
|---|---|---|---|
| OBJID 1 | 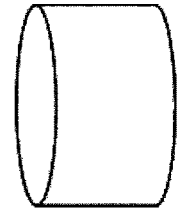 | ARID 1 | $M_1$ |
| OBJID 2 | BE CAREFUL! | ARID 1 | $M_2$ |
| OBJID 3 | TURN RIGHT | ARID 2 | $M_3$ |
| OBJID 4 |  | ARID 3 | $M_4$ |

FIG. 9A

| VIRTUAL AR OBJECT ID | VIRTUAL AR MARKER ID | AR OBJECT | REFERENCE AR MARKER ID | RELATIVE COORDINATION FROM REFERENCE AR MARKER |
|---|---|---|---|---|
| VOBJID 1 | ARID 1 | 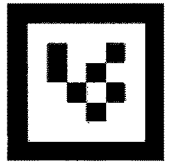 | ARID 2 | $M_{V1}$ |
| VOBJID 2 | ARID 2 |  | ARID 1 | $M_{V2}$ |

FIG. 9B

| VIRTUAL AR OBJECT ID | VIRTUAL AR MARKER ID | AR OBJECT | REFERENCE AR MARKER ID | RELATIVE COORDINATION FROM REFERENCE AR MARKER |
|---|---|---|---|---|
| VOBJID 1 | ARID 1 |  | ARID 2 | $M_{V1}$ |
| VOBJID 2 | ARID 3 |  | ARID 2 | $M_{V2}$ |
| VOBJID 3 | ARID 1 |  | ARID 3 | $M_{V3}$ |
| VOBJID 4 | ARID 2 |  | ARID 3 | $M_{V4}$ |
| VOBJID 5 | ARID 2 |  | ARID 1 | $M_{V5}$ |
| VOBJID 6 | ARID 2 |  | ARID 1 | $M_{V6}$ |

DISPLAY CONTROL METHOD AND SYSTEM

CROSS-REFERENCE TO RELATED APPLICATION

This application is based upon and claims the benefit of priority of the prior Japanese Patent Application No. 2014-084878, filed on Apr. 16, 2014, the entire contents of which are incorporated herein by reference.

FIELD

The embodiment discussed herein is related to a technology which controls display of content.

BACKGROUND

An augmented reality (AR) technology that superimposedly displays object information on an image captured by a camera (imaging unit), which is provided in a display apparatus, has been known. In the AR technology, an object (hereinafter, referred to as an "AR object" as occasion calls), which is superimposedly displayed in Augmented space, is arranged based on an AR marker based on AR marker (reference object) image information and ID which are recognized from the captured image. The arrangement of the AR object is defined according to the position of the AR marker. Therefore, if the AR marker is not recognized from the image, the AR object is not displayed. A relevant technology is disclosed in, for example, Japanese Laid-open Patent Publication No. 2012-103789.

SUMMARY

According to an aspect of the invention, a system includes ciricutry configured to detect a first object and a second object from a first image captured by an electronic device, generate positional relationship information between the first object and the second object, and distortion information regarding a second shape of the second object in the first image with reference to a first shape of the first object in the first image, store, into a memory, the positional relationship information and the distortion information associated with the second object, acuire a second image from the electronic device, and control a display to display a content associated with the second object based on the positional relationship information and the distortion information when the first object is detected from the second image and when the second object is not detected from the second image, the content data being superinposed on the second image at a specific position with respect to the second object.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of an AR marker DB;

FIG. 8 is a diagram illustrating an example of AR display object DB;

FIGS. 9A and 9B are diagrams illustrating examples of a virtual AR marker DB;

DESCRIPTION OF EMBODIMENT

As described above, it is difficult to display an AR object in a situation in which an AR marker is not recognized. However, even if the AR marker is not recognized, the display of the AR object is not unnecessary. For example, in a case of an accidental factor (for example, an AR marker is covered with a person, an object, steam or the like) or a device factor (for example, it is difficult to withdraw recent because of the limitation of an angle of view of a camera, and thus an AR marker is not reflected), it is preferable that the AR object is displayed in succession.

In addition, the AR marker is a substance for recognizing an ID to be associated with the AR object, and a substance for prescribing the position of a camera. Therefore, if only information about the AR object is separately maintained, the AR object may be arranged in a wrong position when a camera moves.

On one aspect, an object of the technology disclosed in the embodiment is to display an object which is associated with a reference object, such as a non-recognized AR marker, in an appropriate position.

Hereinafter, an embodiment will be described with reference to the accompanying drawings.

Example of Schematic Configuration of Display System

Figure 1:
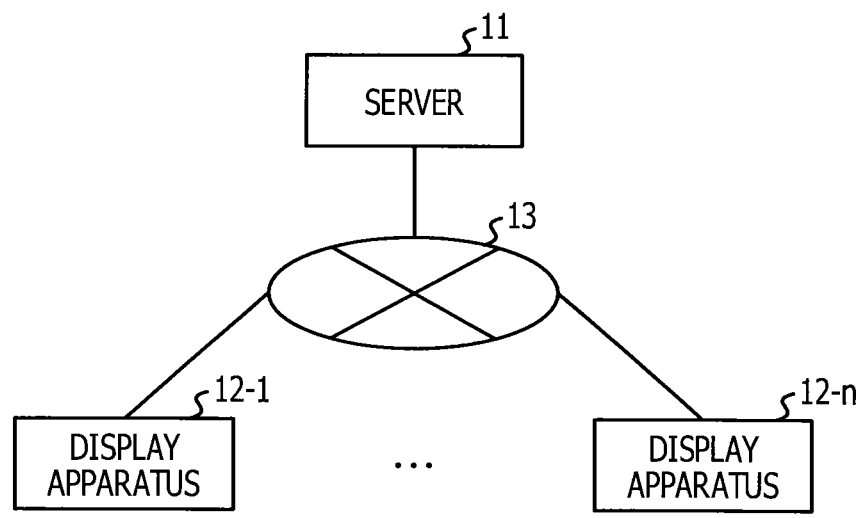
FIG. 1 is a diagram illustrating an example of the schematic configuration of a display system.

FIG. 1 is a diagram illustrating an example of the schematic configuration of a display system. A display system 10 illustrated in FIG. 1 includes a server 11 as an information processing apparatus (external apparatus), and one or more display apparatuses 12-1 to 12-$n$ (hereinafter, generally referred to as a "display apparatus 12" as occasion calls).

The server 11 is connected to the display apparatus 12 through, for example, a communication network 13 in a state in which data may be transmitted and received.

The server 11 manages AR markers, which are examples of reference objects, and AR objects which are registered in association with the respective AR markers. Here, the AR markers are, for example, signs for designating content or positions to be displayed of various types of content information of the AR objects. The AR markers are, for example, images, such as two-dimensional codes, in which prescribed patterns, letter patterns or the like are formed in prescribed areas. However, the AR markers are not limited thereto. In addition, the AR objects are, for example, model data of three-dimensional objects which are arranged in three-dimensional virtual space corresponding to actual space, or the like. For example, the AR objects are pieces of superimposition information which are superimposedly displayed on an image captured by the display apparatus 12. The AR objects are displayed in positions which are set in relative coordinates based on the AR markers included in, for example, the captured image (which may be a moving picture or a still image) after distortion corresponding to the pieces of distortion information of captured AR markers are applied.

The AR objects according to the embodiment are associate with, for example, the AR markers or the like, and have, for example, various forms such as text, an icon, an animation, a mark, a pattern, an image, and a video (moving picture). In addition, the AR objects are not limited to AR objects which are displayed and outputted, and may include, for example, information such as voice.

When the server 11 receives information (AR marker ID) for identifying an AR marker from the display apparatus 12, the server 11 transmits the AR marker size information, which indicates the size or the shape of the corresponding AR marker, to the display apparatus 12. In addition, the server 11 extracts an AR object registered in association with the AR marker ID, and transmits the extracted AR object to the display apparatus 12.

The server 11 may be, for example, a Personal Computer (PC) or the like. However, the server 11 is not limited thereto. For example, the server 11 may be a cloud server, which includes one or more information processing apparatuses structured based on cloud computing.

The display apparatus 12 photographs an AR marker on actual space using an image unit such as a camera. In addition, the display apparatus 12 recognizes information corresponding to the AR marker included in the input image which is captured by a camera or the like. In addition, the display apparatus 12 registers an AR object with regard to the recognized AR marker. The registered information may be transmitted to the server 11, may be managed in the server 11, or may be managed in the display apparatus 12.

In addition, the display apparatus 12 recognizes, for example, a plurality of AR markers from the input image and recognizes each of other AR markers as a virtual AR marker (virtual reference object) with regard to each of the AR markers. The virtual AR marker includes relative positional information (relative coordinate) between other AR markers and the AR markers, and the distortion information for the AR markers.

Meanwhile, the recognition of the virtual reference object may not be necessarily performed immediately when the plurality of AR markers are recognized. An AR object corresponding to the recognized AR marker may be displayed first, and then the above-described virtual AR marker may be recognized.

In addition, when any one of the above-described plurality of AR markers is not recognized, the display apparatus 12 displays an AR object associated with the non-recognized AR marker based on the relative positional information and the distortion information of a virtual AR marker corresponding to the non-recognized AR marker, the relative positional information, and the distortion information being acquired from the recognized AR markers. Meanwhile, any one of the plurality of AR markers includes, for example, one or more AR markers of the plurality of AR markers but does not include all the AR markers. The reason for this is that, when at least one AR marker is not recognized, it is difficult to acquire a virtual AR marker defined in the AR marker.

In addition, when any one of the plurality of AR markers is not recognized, the display apparatus 12 may acquire information relevant to an AR object associated with the non-recognized AR marker, from the server 11, the information relevant to an AR object being acquired from the recognized AR marker.

In addition, when another AR marker is recognized as the virtual AR marker, the display apparatus 12 may take over and recognize information about the virtual AR marker which is already set to another AR marker. In this way, if the information about the virtual marker is sequentially taken over, it is possible to associate relevant AR marker even if relevant AR markers are not simultaneously displayed.

The display apparatus 12 is, for example, a tablet terminator, a smart phone, a personal digital assistants (PDA), a note-type PC, or the like. However, the display apparatus 12 is not limited thereto, and may be, for example, a communication terminal such as a game machine or a mobile phone.

The communication network 13 is, for example, the Internet, a local area network (LAN), or the like. However, the communication network 13 is not limited thereto. In addition, the communication network 13 may be wired, wireless, or a combination thereof.

In the display system 10 illustrated in FIG. 1, the server 11 and the display apparatus 12 have a one-to-n configuration. However, the server 11 and the display apparatus 12 are not limited thereto. The server 11 and the display apparatus 12 may include, for example, a plurality of servers.

Example of Functional Configuration of Display Apparatus 12

Figure 2:
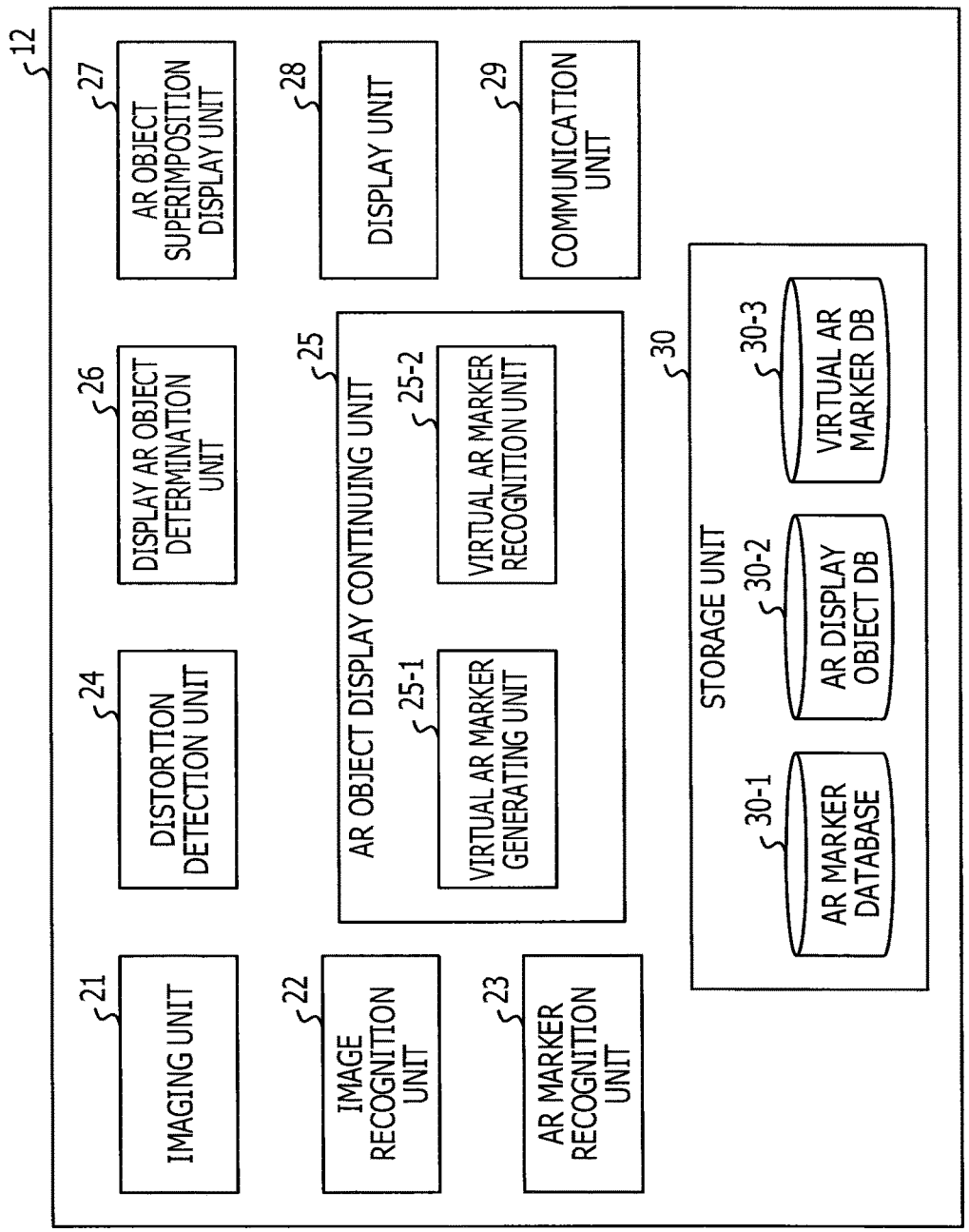
FIG. 2 is a diagram illustrating an example of the functional configuration of the display apparatus.

Subsequently, an example of the functional configuration of the above-described display apparatus 12 will be described with reference to the drawing. FIG. 2 is a diagram illustrating an example of the functional configuration of the display apparatus. The display apparatus 12 illustrated in FIG. 2 includes an imaging unit 21, an image recognition unit 22, an AR marker recognition unit 23, a distortion detection unit 24, an AR object display continuing unit 25, a display AR object determination unit 26, an AR object superimposition display unit (object display unit) 27, a display unit 28, a communication unit 29, and a storage unit 30. The AR object display continuing unit 25 includes a virtual AR marker generation unit (generation unit) 25-1 and a virtual AR marker recognition unit 25-2. In addition, the storage unit 30 includes an AR marker database (hereinafter, the database is referred to as "DB") 30-1, an AR display object DB 30-2, and a virtual AR marker DB 30-3.

The imaging unit 21 photographs, for example, an image of actual space in a preset angle of view. The image may be a moving picture (video) or a still image. When the image is the moving picture, the image includes a plurality of image frames. The imaging unit 21 is, for example, a camera or the like but is not limited thereto.

The image recognition unit 22 detects a marker, which is an example of a reference object, from the image captured by the imaging unit 21. In addition, the image recognition unit 22 acquires positional information of the detected marker or the like.

When the marker is detected by the image recognition unit 22, the AR marker recognition unit 23 acquires the identification information of the AR marker (for example, AR marker ID) or the like with reference to pattern and size information (for example, a size, a shape, and the like) of AR markers which are registered in advance in the AR marker DB 30-1 of the storage unit 30.

The distortion detection unit 24 compares the image of the AR marker which is recognized by the image recognition unit 22 with the image of a plan AR marker which is recognized by the AR marker DB 30-1, and performs a distortion detection process. Here, the distortion detection is, for example, to detect a position of the physical arrangement of the AR marker with regard to the imaging unit 21 which photographs the AR marker. Since the AR marker, which is registered in the AR marker DB 30-1, stores information which indicates the pattern or size information (for example, size, shape, and the like), or the like of the AR marker acquired when the AR marker is captured from the front in a non-distortion state, the degree in which the AR marker captured by the imaging unit 21 is distorted from the front position us detected based on the information.

The distortion detection unit 24 may deform, for example, the AR marker in the non-distortion state in an arbitrary range, may match the deformed AR marker to the AR marker captured by the imaging unit 21, and may acquire the amount of deformation (for example, the amount of rotation or inclination in a three-dimensional direction), acquired when the two AR markers coincide with each other, as the distortion information. The distortion detection unit 24 may store the detected distortion information in the AR marker DB 30-1, the internal memory, or the like after causing the detected distortion information (calibration information) to be included in the size information for each AR marker.

Here, when a plurality of (two or more) AR markers are simultaneously recognized from the captured image, the virtual AR marker generation unit 25-1 of the AR object display continuing unit 25 recognizes a counterpart AR marker of the respective AR markers (for example, an AR marker A and an AR marker B) as a virtual AR object, and generates (defines) a virtual AR marker. For example, the virtual AR marker generation unit 25-1 generates (defines) the virtual AR markers in such a way that the AR marker A uses the AR marker B as the virtual AR object b and the AR marker B uses the AR marker A as the virtual AR object a.

In this case, in the above-described distortion detection unit 24, the distortion Xa of the AR marker A, which is acquired by the AR marker recognition unit 23, is detected. Therefore, the virtual AR marker generation unit 25-1 corrects the AR marker B using the distortion Xa which is detected by the distortion detection unit 24 (BXa). Therefore, if the AR marker A is plan and is captured by the imaging unit 21 at a reference distance, it is possible to understand a way that the AR marker B is reflected in the image with regard to the AR marker A. Therefore, the relative coordinate based on the AR marker A is acquired, and thus it is possible to define the AR marker B as the virtual AR object b of the AR marker A. The result is maintained in the virtual AR marker DB 30-3.

The virtual AR marker generation unit 25-1 defines the AR marker A as the virtual AR object a based on the AR marker B in the same manner, and maintains the defined information in the virtual AR marker DB 30-3.

In addition, the virtual AR marker generation unit 25-1 recognizes another AR marker as a virtual AR marker, and the virtual AR marker generation unit 25-1 may sequentially take over and define the information of the virtual AR marker which is set to another AR marker in advance. In this case, the number of virtual AR markers gradually increases. Therefore, the virtual AR marker is taken over by setting a threshold to time, the number or the like, and then is removed after a predetermined time elapses. In addition, when the number of virtual AR markers is equal to or greater than the threshold, the virtual AR marker may not be taken over. In addition, the virtual AR marker generation unit 25-1 may perform control to determine whether or not to take over the virtual AR marker according to the distance between the respective AR markers.

The virtual AR marker recognition unit 25-2 of the AR object display continuing unit 25 searches the virtual AR marker DB 30-3 using the AR marker ID which is acquired by the AR marker recognition unit 23. In addition, when the virtual AR object is defined based on the AR marker ID, the virtual AR marker recognition unit 25-2 checks whether or not an actual AR marker which has the same virtual AR marker ID which is realized by the virtual AR object is present in the same screen. When a plurality of same IDs are present, the virtual AR marker recognition unit 25-2 sets one of them as a target and ignores the rest. The reason for this is to cause the AR marker A and virtual AR object a not to be simultaneously processed, for example, when the AR marker A and the AR marker B are simultaneously detected and the virtual AR object b and the virtual AR object a are defined for the AR marker A and the AR marker B.

The display AR object determination unit 26 searches the AR display object DB 30-2 associated with the ID using the AR marker ID which is acquired by the AR marker recognition unit 23, and determines an AR object to be displayed.

The AR object superimposition display unit 27 acquires a relative coordinate from the AR marker for each AR object which is determined by the display AR object determination unit 26. In addition, the AR object superimposition display unit 27 corrects a display position or shape using AR marker distortion information acquired by the distortion detection unit 24.

The display unit 28 superimposes the AR object using the corrected shape or the like on the image captured by the imaging unit 21, and displays the superimposed image. In addition, the display unit 28 is, for example, a monitor, a display, or the like.

It is possible for the communication unit 29 to transmit and receive data to and from an external apparatus, such as the server 11, through the communication network 13. When, for example, at least one of the plurality of AR markers is not recognized, the communication unit 29 performs an inquiry about information relevant to an object which is associated with the non-recognized AR marker on the server 11 or the like, and acquires corresponding information. In addition, it is possible to acquire various types of information relevant to the AR object from the server 11 or the like.

The storage unit 30 stores various types of information which are to be used for performing a display process according to the embodiment. Meanwhile, information which is stored in the storage unit 30 is not limited to information stored in the above-described AR marker DB 30-1, the AR display object DB 30-2, the virtual AR marker DB 30-3, and the like. For example, log information (history information), error information, and access information to the external apparatus, which are acquired when the display process is performed, may be stored.

Example of Hardward Configuration of Display Apparatus 12

Figure 3:
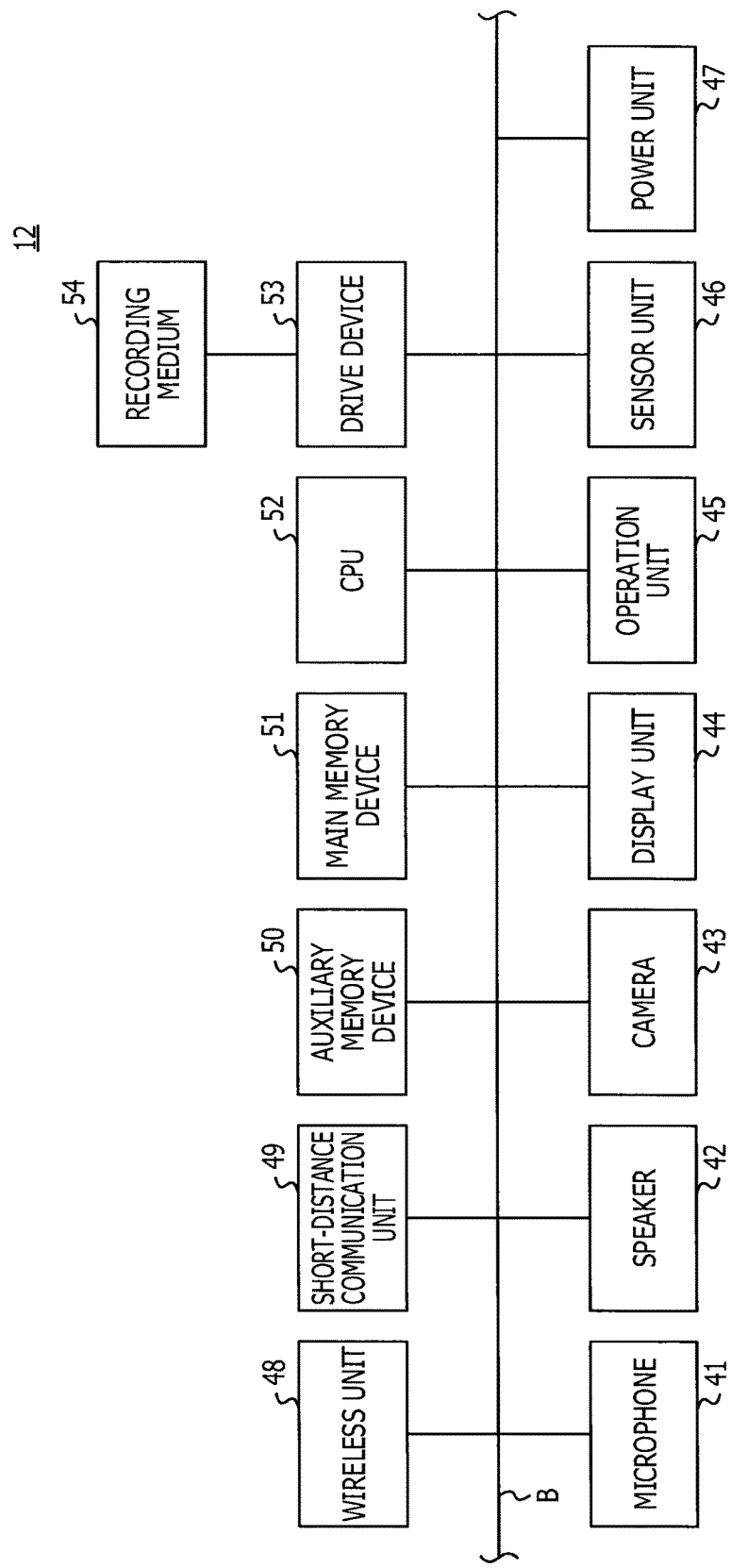
FIG. 3 is a diagram illustrating an example of the hardware configuration of the display apparatus.

Subsequently, an example of the hardware configuration of the display apparatus 12 will be described. FIG. 3 is a diagram illustrating the example of the hardware configuration of the display apparatus. In the example of FIG. 3, the display apparatus 12 includes a microphone (hereinafter, referred to as a "mike") 41, a speaker 42, a camera 43, a display unit 44, an operation unit 45, a sensor unit 46, a power unit 47, a wireless unit 48, a short-distance communication unit 49, an auxiliary storage device 50, a main storage device 51, a CPU 52, and a drive device 53, which are connected to each other through a system bus B.

The mike 41 inputs voice spoken by a user or other sounds. The speaker 42 outputs the voice of another person on the phone or outputs sounds such as the ringtone. It is possible to use the mike 41 and the speaker 42 when, for example, talking with another person on the phone using a call function or the like. However, the disclosure is not limited thereto, and it is possible to use the mike 41 and the speaker 42 to input and output information using voice.

The camera 43 photographs, for example, the image (moving picture, still image) of the actual space in the preset angle of view. The camera 43 is, for example, an example of the above-described imaging unit 21.

The display unit 44 displays a screen which is set using an operating system (OS) or various applications (for example, an image, in which an AR object is superimposed on actual space, or the like) for the user. In addition, the display unit 44 may be a touch panel display or the like. In this case, the display unit 44 has a function as an input/output unit.

The display unit 44 is, for example, a display such as a liquid crystal display (LCD) or an organic electro luminescence (EL). The display unit 44 is an example of, for example, the above-described display unit 28.

The operation unit 45 includes operating buttons which are displayed on the screen of the display unit 44, operating buttons which are provided on the outside of the display apparatus 12, or the like. The operating buttons may be, for example, a power button or volume adjustment buttons, or may be operating keys for letter input which are arranged in prescribed order.

When the user performs a prescribed operation on, for example, the screen of the display unit 44 or presses the above-described operating buttons, a touch position on the screen is detected by the display unit 44. In addition, it is possible for the display unit 44 to display a result of execution of an application, content, icons, a cursor, and the like on the screen.

The sensor unit 46 detects an operation at a certain point of time or a continuous operation of the display apparatus 12. For example, the sensor unit 46 detects the angle of inclination, the acceleration, the direction, the position and the like of the display apparatus 12, but the embodiment is not limited thereto. Meanwhile, for example, there is a tilt sensor, an acceleration sensor, a gyro sensor, a Global Positioning System (GPS), or the like as the sensor unit 46, but the sensor unit 46 is not limited thereto.

The power unit 47 supplies power to each of the components of the display apparatus 12. The power unit 47 is, for example, an internal power source such as a battery but is not limited thereto. The power unit 47 detects the amount of power at regular or prescribed time intervals, and may monitor the residual quantity or the like of the amount of power.

The wireless unit 48 is, for example, a communication data transmission and reception unit which receives a wireless signal (communication data) from a base station using an antenna or transmits the wireless signal to the base station through the antenna.

The short-distance communication unit 49 may perform short-distance communication with a computer of another display apparatus 12 using, for example, a communication method, such as infrared communication, Wi-Fi (registered trademark), Bluetooth (registered trademark) or the like. The above-described wireless unit 48 and the short-distance communication unit 49 are communication interfaces which enable data transmission and reception with another computer.

The auxiliary storage device 50 is, for example, a storage substance such as a hard disk drive (HDD) or a solid state drive (SSD). The auxiliary storage device 50 stores an execution program (display program) according to the embodiment, a control program provided in a computer or the like based on the control signal from the CPU 52, and performs input and output as occasion calls. The auxiliary storage device 50 may read or write desired information from each pieces of stored information based on the control signal from the CPU 52.

The main storage device 51 stores the execution program or the like which is read from the auxiliary storage device 50 according to an instruction from the CPU 52 or stores various types of information or the like which is acquired when the program is executed. The main storage device 51 is, for example, a read only memory (ROM), random access memory (RAM), or the like.

When the CPU 52 controls the entire process of the computer, such as various operations or data input and output to and from each of the hardware components, based on a control program, such as the OS and the execution program stored in the main storage device 51, each process in output control is realized.

More specifically, when the CPU 52 executes, for example, a program installed in the auxiliary storage device 50 based on an instruction to execute a program, which is acquired from the operation unit 45 or the like, a process corresponding to the program is performed on the main storage device 51. For example, when the CPU 52 executes the display program, a process to perform imaging in actual space performed by the above-described imaging unit 21, a process to recognize an image performed by the image recognition unit 22, a process to recognize the AR marker performed by the AR marker recognition unit 23, a process to detect distortion performed by the distortion detection unit 24, or a process to generate a virtual AR marker or to recognize the virtual AR marker performed by the AR object display continuing unit 25 is performed. In addition, when the CPU 52 executes the display program, a process to determine a display AR object by the display AR object determination unit 26, a process to perform superimposition display by the AR object superimposition display unit 27, or a process to perform display by the display unit 28 is performed. The content of process in the CPU 52 is not limited to the above-described content. Content which is executed by the CPU 52 is stored in the auxiliary storage device 50 or the like as occasion calls.

The drive device 53 enables, for example, a recording medium 54 or the like to be detachably established, may read various types of information recorded in the established recording medium 54, or may write prescribed information into the recording medium 54. The drive device 53 is, for example, a medium loading slot or the like but is not limited thereto.

The recording medium 54 is a recording medium which may be read by a computer which stores the execution program as described above. The recording medium 54 may be, for example, a semiconductor memory such as flash memory. In addition, the recording medium 54 may be a portable recording medium such as a USB memory but is not limited thereto.

In the embodiment, when an execution program (for example, display program or the like) is installed in the above-described hardware component of a computer main body, it is possible to realize the display process or the like according to the embodiment in such a way that hardware resources cooperate with software. In addition, the display program corresponding to the above-described display process may be, for example, in a state in which the display program permanently resides on an apparatus or may be driven according to a start instruction.

Example of Display Process

Figure 4:
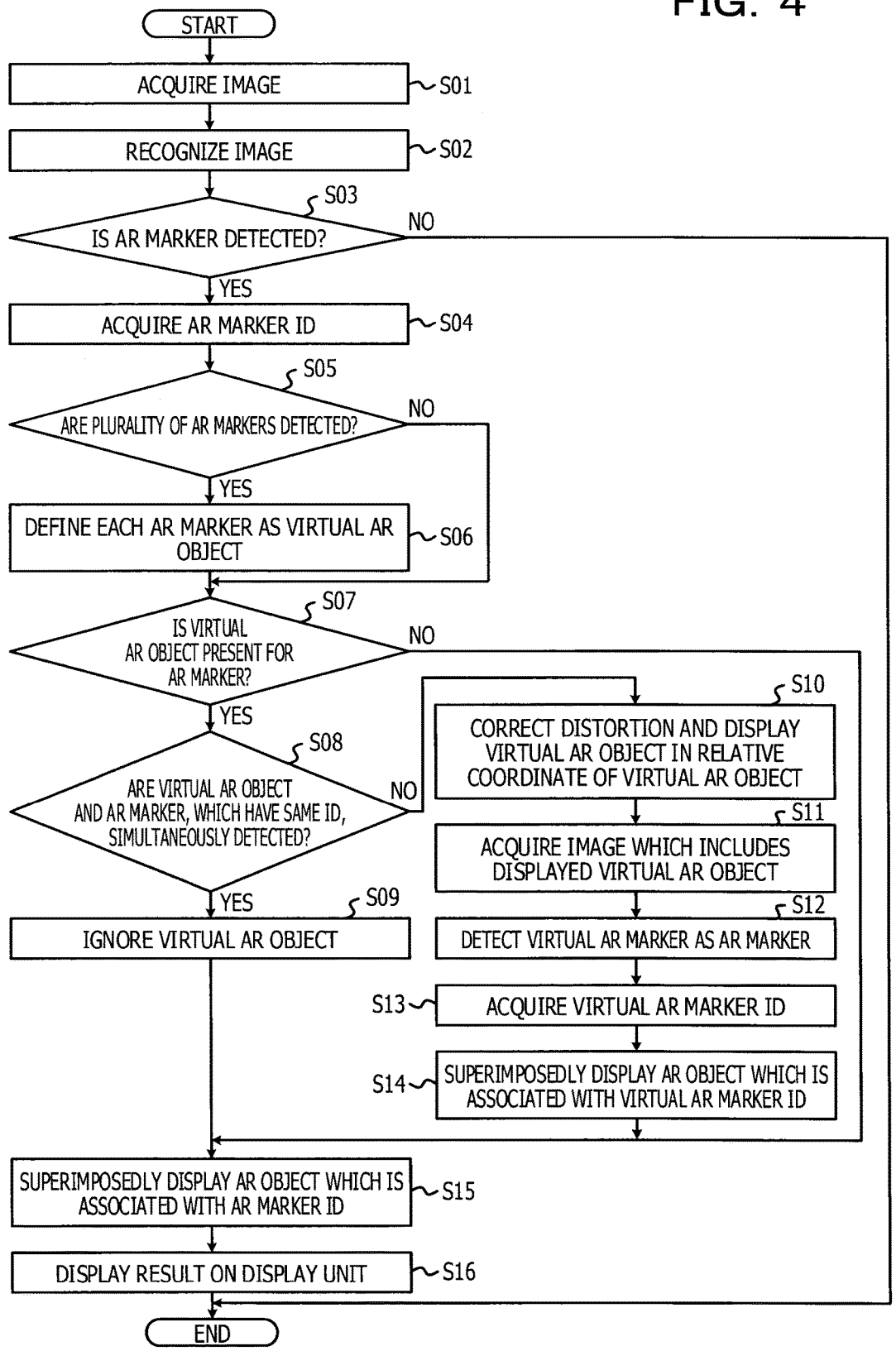
FIG. 4 is a flowchart illustrating an example of a display process according to an embodiment.

Subsequently, an example of the display process according to the embodiment will be described using a flowchart. FIG. 4 is a flowchart illustrating the example of the display process according to the embodiment. In the example of FIG. 4, the imaging unit 21 acquires an image (which may be a moving picture or a still image) in actual space through photographing or the like (S01). Meanwhile, the image acquired in the process of S01 may be an image captured from an apparatus other than the display apparatus 12. Subsequently, the image recognition unit 22 performs image recognition on the image acquired in the process of S01 (S02).

Subsequently, the AR marker recognition unit 23 determines whether or not an AR marker is detected from the result of the recognition process performed in step S02 (S03). When the AR marker is detected (YES in S03), the AR marker recognition unit 23 acquires an AR marker ID (S04). Subsequently, the AR marker recognition unit 23 determines whether or not a plurality of AR markers are detected (S05). When the plurality of AR markers are detected (YES in S05), the AR object display continuing unit 25 defines each of the AR markers as a virtual AR object (S06). Meanwhile, when definition is previously performed in the process of S06, the definition may not be performed again. The defined information is stored in the virtual AR marker DB 30-3. An example of the process of S06 will be described later.

Subsequently, when the plurality of AR markers are not detected after the process in S06 or in the process of S05 (NO in S05), the AR object display continuing unit 25 determines whether or not virtual AR objects are present for the AR markers (reference AR markers) with reference to the virtual AR marker DB 30-3 (S07). When the virtual AR objects are present for the AR markers (YES in S07), the AR object display continuing unit 25 determines whether or not a virtual AR object and an AR marker, which have the same ID, are simultaneously detected (S08).

When a virtual AR object and an AR marker, which have the same ID, are simultaneously detected (YES in S08), the AR object display continuing unit 25 gives priority to, for example, the AR marker and ignores the virtual AR object thereof (S09).

In addition, when a virtual AR object and an AR marker, which have the same ID, are not simultaneously detected in the process of S08 (NO in S08), the AR object display continuing unit 25 corrects the distortion and displays the virtual AR object in the relative coordinate of the virtual AR object (S10). Subsequently, the AR object display continuing unit 25 acquires an image which includes the displayed virtual AR object (S11) and detects a virtual AR marker as an AR marker (S12).

Subsequently, the display AR object determination unit 26 acquires a virtual AR marker ID, and acquires and determines an AR object, which is associated with the virtual AR marker ID, from the AR display object DB 30-2 (S13). Subsequently, the AR object superimposition display unit 27 superimposedly displays the AR object, which is associated with the virtual AR marker ID, which is acquired by the display AR object determination unit 26 (S14).

Here, after the process of S09 and the process of S14 or in the process of S08, when virtual AR objects are not present for the AR markers (NO in S08), the AR object superimposition display unit 27 superimposedly displays the AR object, which is associated with the virtual AR marker ID, which is acquired by the display AR object determination unit 26 from the AR display object DB 30-2 (S15), and displays the result on the display unit 28 such as a monitor (S16).

In addition, in the above-described process of S03, when an AR marker is not detected in the image captured by the imaging unit 21 (NO in S03), the display process ends without change. In the embodiment, for example, when photographing is being performed by the imaging unit 21, the above-described display process is repeatedly performed. Meanwhile, in the embodiment, in the above-described process of S06, for example, a part of AR markers based on preset conditions may be defined as the virtual AR objects from among other AR markers. In addition, in the embodiment, an AR object corresponding to the AR marker which is detected by the image recognition is displayed first, and then each of the AR markers may be defined as a virtual AR object as in the process of S06.

S06; Virtual AR Object Definition Process

Figure 5:
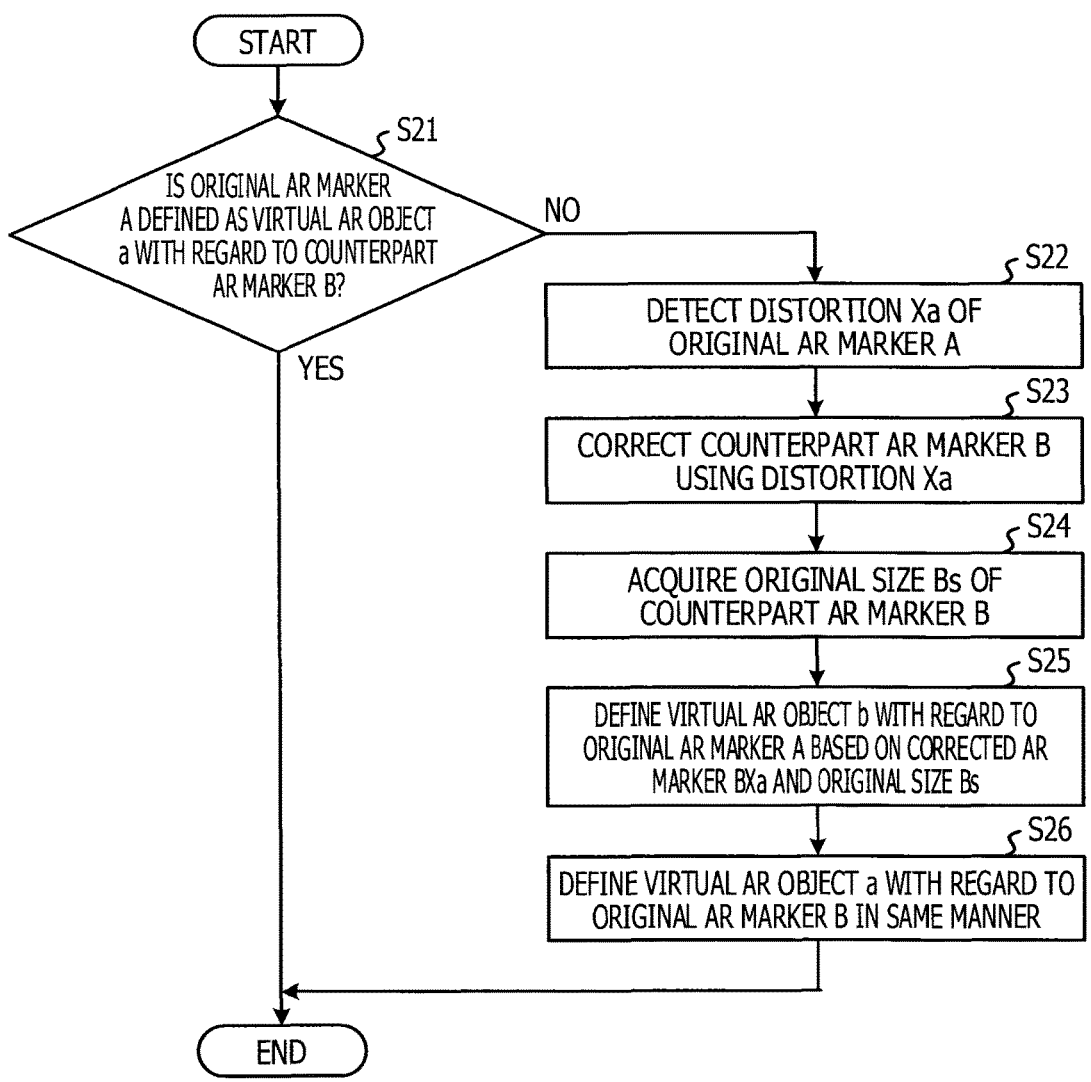
FIG. 5 is a flowchart illustrating an example of a virtual AR object definition process.

Subsequently, a virtual AR object definition process in the above-described process of S06 will be described with reference to a flowchart. FIG. 5 is a flowchart illustrating an example of the virtual AR object definition process. Meanwhile, in description below, an example, in which AR objects a and b corresponding to the respective AR markers are defined when two AR markers A and B are present in the image captured by the imaging unit 21, will be described but is not limited thereto. For example, it is possible to perform virtual AR object definition in such a way that the same process is performed when three or more AR markers are present in the captured image.

In the example of FIG. 5, the virtual AR marker generation unit 25-1 determines whether or not an original AR marker A is defined as the virtual AR object a with regard to the counterpart AR marker B (S21). When the AR marker A is not defined as the virtual AR object with regard to the counterpart AR marker B (NO in S21), the distortion detection unit 24 detects the distortion Xa of the original AR marker A (S22).

Subsequently, the virtual AR marker generation unit 25-1 corrects the counterpart AR marker B using the distortion Xa (S23). Subsequently, the virtual AR marker generation unit 25-1 refers to the AR marker DB 30-1, and acquires the original size Bs of the counterpart AR marker B (S24). Meanwhile, the original size Bs is, for example, size information Bs which indicates the size or the shape of a marker which is viewed from the front and which is not distorted as described above. Subsequently, the virtual AR marker generation unit 25-1 defines the virtual AR object b with regard to the original AR marker A based on a corrected AR marker BXa and the original size Bs (S25).

Subsequently, the virtual AR marker generation unit 25-1 defines the virtual AR object a with regard to the original AR marker B in the same manner (S26). The defined information is stored in the virtual AR marker DB 30-3. Meanwhile, in the above-described process of S21, when the original AR marker A is defined as the virtual AR object a with regard to the counterpart AR marker B (YES in S21), the process ends without change.

Meanwhile, in the above-described process, the size information Bs is shared under the assumption that all the sizes (actual sizes) of the AR markers are the same, and is registered in the AR marker DB 30-1. The size information Bs may include, for example, a parameter (calibration information) which has distortion information indicative of a size to be recognized on the display unit 28 when the AR marker A is captured as the image of the imaging unit 21. In contrast, when each of the AR markers is not set to the same actual size in a custom manner, the AR marker size information Bs is not identical. In this case, calibration information may be prepared for each AR marker in advance, and may be maintained in the AR marker DB 30-1.

S14 And S15; Superimposition Display Process

Figure 6:
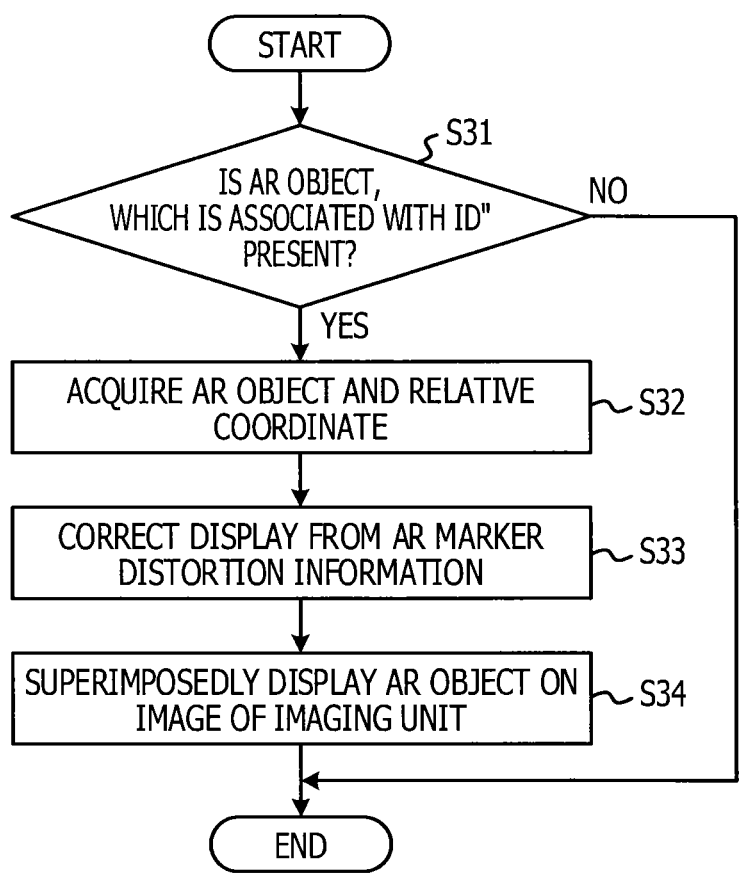
FIG. 6 is a flowchart illustrating an example of a superimposition display process.

Subsequently, an example of the superimposition display process in the above-described steps S14 and S15 will be described with reference to a flowchart. FIG. 6 is a flowchart illustrating the example of the superimposition display process.

In the example of FIG. 6, the AR object superimposition display unit 27 determines whether or not an AR object associated with the AR marker ID is present (S31). The AR marker in S31 is the virtual AR marker ID in a case of the process of S14, and the AR marker in S31 is the AR marker ID in a case of the process of S15.

When an AR object is present in the process of S31 (YES in S31), the AR object and the relative coordinate (relative positional information with regard to the reference AR marker) are acquired from, for example, the AR display object DB 30-2 (S32).

Subsequently, the AR object superimposition display unit 27 corrects display based on the AR marker distortion information or the like (S33), and superimposes the AR object on the image captured by the imaging unit 21, such as the camera, and displays the superimposed AR object on the display unit 28 (S34). Meanwhile, when the AR object associated with an ID is not present in the above-described process S31 (NO in S31), the process ends.

Meanwhile, the process of FIG. 6 is performed on one or more AR markers and virtual AR markers which are included in the captured image. For example, when the AR marker ID is identical to the virtual AR marker ID, the process is performed while giving priority to the AR marker ID, and a process with regard to the virtual AR marker ID may be ignored.

Example of Data

Subsequently, various examples of data (the AR marker DB 30-1, the AR display object DB 30-2, and the virtual AR marker DB 30-3) which are used in the display process according to the embodiment will be described with reference to the drawings.

FIG. 7 is a diagram illustrating an example of the AR marker DB. Items of the AR marker DB 30-1 illustrated in FIG. 7, include, for example, an "AR marker ID", an "AR marker pattern", an "AR marker size information" and the like but are not limited thereto. The AR marker ID is identification information for identifying an AR marker. The AR marker pattern stores a marker pattern (shape) or the like which is the reference in a process to recognize whether or not an AR marker is present in the image captured by the imaging unit 21. The marker pattern may be a different pattern for each ID or a plurality of marker patterns may be present for a single ID.

In the example of FIG. 7, marker patterns, which are viewed from the front and which have a preset reference size, are stored. Distortion detection or the like is performed by comparing the images and the captured AR marker, and the AR marker size information is maintained as correction information.

The size or the shape of a marker is stored as the AR marker size information. In addition, when the size or the shape of the marker is designed for each user in a custom manner, the size information is different from the actual size of the AR marker. Therefore, the size information for calibration for each AR marker is stored in advance. When the information is used, it is possible to appropriately perform correction or coordinate conversion of a position or a shape.

FIG. 8 is a diagram illustrating an example of the AR display object DB. Items of the AR display object DB 30-2 illustrated in FIG. 8 include, for example, an "AR object ID", an "AR object", a "reference AR marker ID", a "reference AR marker ID", a "relative coordinate from the reference AR marker", and the like but are not limited thereto.

The "AR object ID" is identification information for identifying an AR object which is superimposedly displayed on a screen. The "AR object" stores an object image (a moving picture or a still image), text information, or the like. The "reference AR marker ID" is reference AR marker identification information corresponding to the AR object. In the embodiment, the AR object ID and the reference AR marker ID may be set to have a one-to-one, a one-to-n, or an n-to-one relationship. In the example of FIG. 8, AR object IDs "OBJID1" and "OBJID2" are set for a reference marker ID "AR ID1".

The "relative coordinate from the reference AR marker" stores information indicative of a position which is separated in a certain direction based on the position of the reference AR marker when the AR object is displayed. It is preferable that the "relative coordinate from the reference AR marker" is set to a position which does not overlap with another AR object.

FIGS. 9A and 9B are diagrams illustrating examples of the virtual AR marker DB. FIG. 9A illustrates an example of the virtual AR marker DB 30-3 when there are two AR markers, and FIG. 9B illustrates an example of the virtual AR marker DB 30-3 when there are three AR markers.

Items of the virtual AR marker DB 30-3 illustrated in FIGS. 9A and 9B include, for example, a "virtual AR object ID", a "virtual AR marker ID", an "AR object", a "reference AR marker ID", a "relative coordinate from the reference AR marker" and the like but are not limited thereto.

The "virtual AR object ID" is identification information for identifying a virtual AR object. The "virtual AR marker ID" is identification information for identifying a virtual AR marker. The "AR object" is information about the AR object corresponding to the virtual AR marker ID. The "reference AR marker ID" corresponds to a reference AR marker ID illustrated in the above-described AR display object DB 30-2. The "relative coordinate from the reference AR marker" is a relative coordinate from a reference AR marker.

In the examples of FIGS. 9A and 9B, AR markers, which are different from each other, are associated with respective reference AR marker IDs as virtual AR objects. As illustrated in FIG. 9B, even in a case of the same virtual AR marker IDs, if the reference AR marker IDs are different from each other, the virtual AR marker IDs are defined as different virtual AR object IDs. Meanwhile, in the examples of FIGS. 9A and 9B, when another AR marker is recognized as a virtual AR marker, information about the virtual AR marker, which is set for another AR marker in advance, may be stored.

The items and types of each data illustrated in the above-described FIGS. 7 to 9B are not limited thereto. In addition, each data illustrated in FIGS. 7 to 9B may be stored in the storage unit 30 in the display apparatus 12 or may be managed in the server 11. For example, when each data is managed in the server, the display apparatus 12 may request for the server 11 to acquire data using the AR marker ID recognized by the AR marker recognition unit 23, and may acquire information, which is associated with the AR marker ID, from at least one of the AR marker DB 30-1, the AR display object DB 30-2, and the virtual AR marker DB 30-3. In addition, when the server 11 performs a process to update each data, the updated data may be distributed to each display apparatus 12.

Detailed Example

Subsequently, a detailed example of the display process according to the embodiment will be described with reference to the accompanying drawings. The display process according to the embodiment is used in, for example, a business field called facility maintenance, but is not limited thereto. In the facility maintenance, the information, the procedure, and the precautions of a facility are displayed as AR objects.

Here, in the related art, in order to continue to superimposedly display an AR object on a video (moving picture), the video captured by a camera has to include an AR marker. Therefore, even if the position of the AR object is present in a range of the video reflected in the camera, if the AR marker itself may be out of the photographing range (angle of view) of the camera or the AR marker is covered by an obstacle such as a person or an object, it is difficult to display the AR object.

In addition, even if it is difficult to recognize the AR marker, the display of the AR object is not unnecessary. Even when the AR marker is not recognized, it is desired to continue to display the AR object as long as the AR marker is present at the position (place).

For example, when an AR object is displayed in the vicinity of a high temperature pipe in order to inform that the pipe is dangerous, a worker does not separate from the pipe because a corresponding AR marker is not recognized, and thus it is desired to continue to display an object such as warning. However, when it is difficult to recognize the AR marker, the AR object also disappears.

In addition, the AR marker is a substance which recognizes an ID associated with an AR object, and is a substance which prescribes the position of the camera. Therefore, if only information about the AR object is maintained, the AR object is displayed in a different position and a different shape to be originally displayed when the camera moves.

In addition, a position in which the AR object is drawn in a coordinate system based on the AR marker is specified, and the AR object is drawn through correction (projection) of distortion, which causes the shape of the AR object to be deformed, based on the angle or distortion of the AR marker. The correction of distortion is correction depending on the AR marker and is not applied to a coordinate acquired based on another AR marker in the related art. When the coordinate of the AR object, which is associated with a certain AR marker, is converted into the coordinate of a coordinate system of another AR marker, it is possible to specify a position. However, it is difficult to use correction which is set for the original AR marker as it is, and thus correction of angle or distortion has to be performed again based on a new AR marker.

Meanwhile, the correction of distortion is, for example, to deform an AR object according to a way that an AR marker is reflected in the camera, but is not limited thereto. In addition, when an AR object is displayed on a screen, a distortion correction process to calculate a coordinate based on an AR marker and to deform the AR object based on the shape (distortion) of the AR marker is performed. In addition, the distortion of the shape of the AR marker (inclination with regard to the position of the camera) changes according to a position to which the AR marker is attached. This does not affect when the coordinate of the AR object is specified.

However, since the projection of the AR object is performed based on the shape of a marker, the deformation of the AR object changes if the marker which is a reference changes. Even in the same coordinate, the deformation of the AR object based on the shape of the AR marker A is different from the deformation of the AR object based on the AR marker B.

Here, in the embodiment, an AR object is dynamically associated with a plurality of markers such that the AR object is continued to be displayed even if it is difficult to recognize a reference AR marker from a photograph image. When the AR object is dynamically associated with the AR markers, it is desired to dynamically set a relative coordinate and to perform correction of the angles or distortion of the AR markers. However, the correction of the angles or distortion of the AR markers is correction performed on the coordinate systems of the AR markers. When the coordinate of an AR object which is associated with a certain AR marker is converted into the coordinate of another coordinate system of the AR marker, correction of the angle or distortion has to be performed again.

The AR object is defined using a relative coordinate from a reference AR marker. In other words, the AR object is defined using a coordinate system (marker coordinate system) based on the center of each AR marker. When the AR object is drawn (displayed) on the image captured by the imaging unit 21, it is desired to perform coordinate conversion in order of "(1) marker coordinate system model conversion (coordinate conversion)" and "(2) marker coordinate system visual field conversion (projection)". In addition, when the coordinate of an AR object which is defined in the coordinate system of a certain AR marker (for example, AR marker A) is converted into the coordinate of the coordinate system of another AR marker (for example, AR marker B), it is possible to calculate and acquire coordinate conversion based on a coordinate system model conversion performed on the AR marker A and a coordinate system model conversion performed on the AR marker B.

Figure 10A:
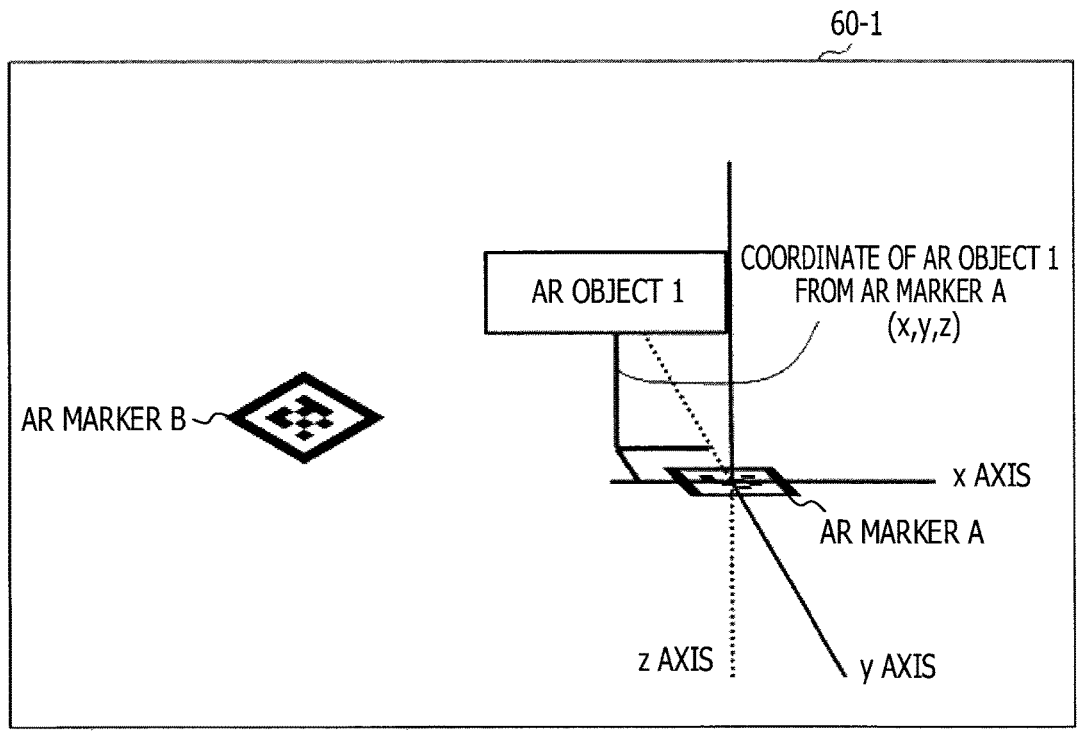
FIGS. 10A and 10B are diagrams illustrating (first) examples of a coordinate system conversion.
Figure 10B:
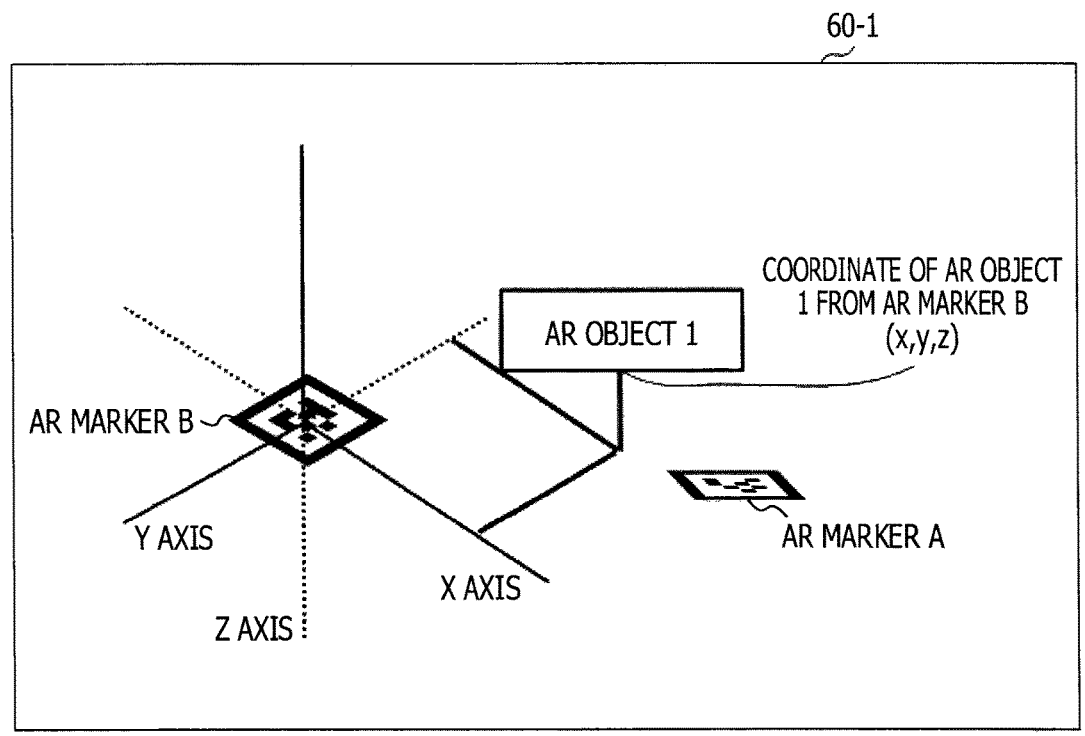
Figure 11A:
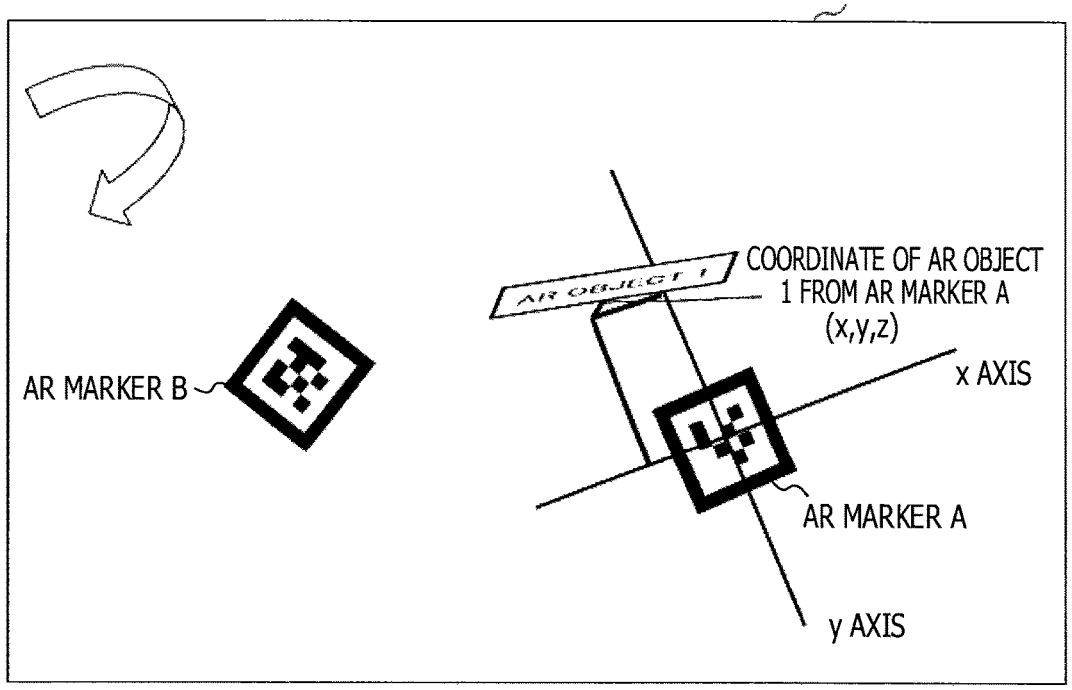
FIGS. 11A and 11B are diagrams illustrating (second) examples of the coordinate system conversion.
Figure 11B:
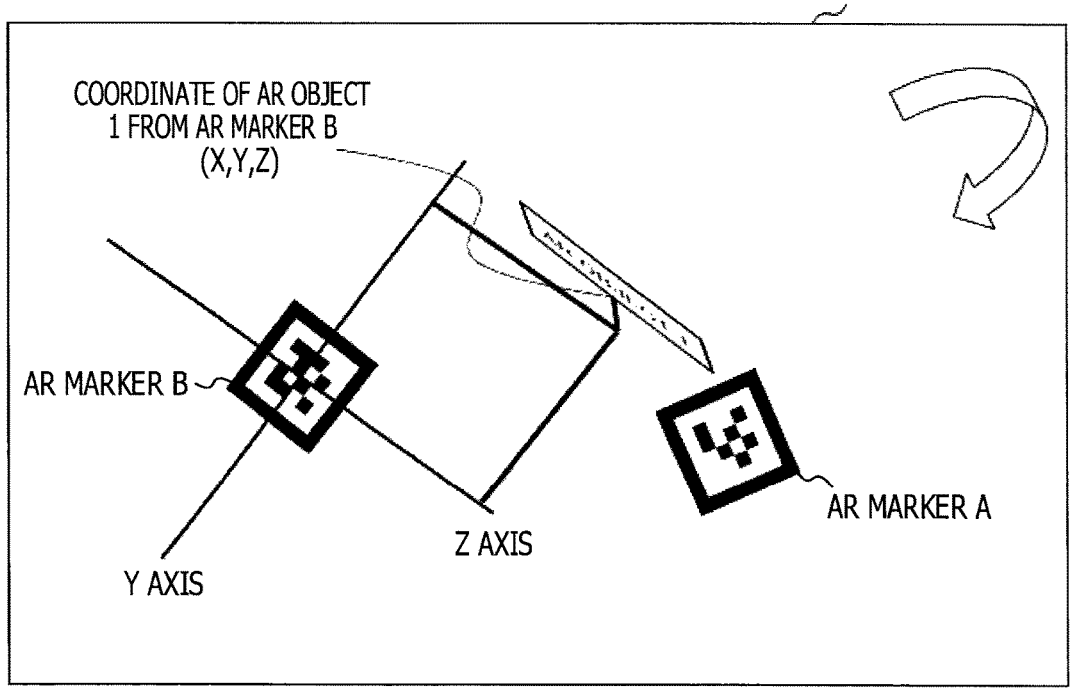

Here, FIGS. 10A, 10B, 11A, and 11B are diagrams illustrating (first and second) examples of the coordinate system. FIG. 10A illustrates an example in which the coordinate system of an AR object 1 is defined based on the AR marker A of the two AR markers (AR markers A and B) which are included in a captured image 60-1. In addition, FIG. 10B illustrates an example in which the coordinate system of the AR object 1 is defined based on the AR marker B. In addition, FIGS. 11A and 11B illustrate examples of a way that the AR object 1 is viewed in an image 60-2 captured from a direction which is different from the camera direction of FIGS. 10A and 10B.

Projections illustrated in FIGS. 10A and 10B are pieces of information which are desired for enlarging or reducing an AR object in accordance with the movement of a viewpoint or a distance. The enlargement or reduction is acquired from, for example, the proportional relationship between the size (size information) of the outer periphery of an actual AR marker and the size of the outer periphery of an AR marker on the coordinate system. The AR marker A projection information may be applied to an AR object based on the AR marker A.

For example, when the AR object 1 is associated with the AR marker A in the above-described example of FIG. 10A, the position of the AR object 1 is specified from coordinate information based on the AR marker A. In addition, as illustrated in FIG. 10B, it is possible to calculate the coordinate of the AR object 1 of the coordinate system based on the marker B so as to overlap with the position of the AR object 1 based on the marker A.

However, as illustrated in FIGS. 11A and 11B, it is difficult to apply projection information based on the AR marker A or the AR marker B to the AR object which is defined again based on the AR marker B in the above-described coordinate conversion.

That is, in the related art, it is difficult to dynamically define the projection information as illustrated in the image 60-2 of FIGS. 11A and 11B. Therefore, it is difficult to automatically associate an AR object, which is completely defined for a certain AR marker, with another AR marker again.

As illustrated in FIGS. 11A and 11B, when the AR object 1 is deformed based on projection information about the marker B in a state in which FIGS. 10A and 10B are viewed from above, the AR object 1 looks different compared to a case based on the marker A. Therefore, in order to acquire the same result, it is desired to understand a way that the marker A is reflected at an angle of a current camera, as illustrated in FIG. 11B.

Here, in the embodiment, when a separate AR marker (for example, the AR marker B) is displayed on the screen in a state in which a certain AR marker (for example, the AR marker A) is displayed on the screen, the mutual AR markers which are reflected in the screen in the respective coordinate systems are dynamically defined as virtual AR objects (virtual AR markers) in the respective coordinate systems. That is, the marker B is generated (defined) as the virtual AR object in the coordinate system of the marker A, and the marker A is generated (defined) as the virtual AR object in the coordinate system of the marker B.

Example of Definition of Virtual AR Marker

Here, FIGS. 12A, 12B, 13A, 13B, 14A, and 14B are diagrams illustrating (first to third) examples in which the virtual AR marker is defined according to the embodiment. In the examples of FIG. 12A to FIG. 14B, the above-described virtual AR object is dynamically defined in a relative coordinate in each marker coordinate system based on, for example, a plan square or the like by the virtual AR marker generation unit 25-1.

For example, two markers (for example, AR markers A and B) are present in an image (which may be a moving picture or a still image) 70-1 which is captured by the imaging unit 21 of the display apparatus 12 and is displayed on the display unit 28.

The AR marker recognition unit 23 recognizes an AR marker from the image 70-1. When the AR markers A and B are detected, the AR marker recognition unit 23 acquires an AR marker ID with reference to the patterns and the sizes of the AR markers which are registered in advance in the AR marker DB 30-1. In addition, the distortion detection unit 24 detects the distortion (a position for the physical arrangement of the AR marker with regard to the camera which is photographing the AR marker) by comparing the image of the AR marker, which is recognized by the AR marker recognition unit 23, with the image of the plan AR marker which is registered in the AR marker DB 30-1. The detected distortion information may be stored while including the size information for each AR marker or may be stored in an internal memory or the like.

Figure 12A:
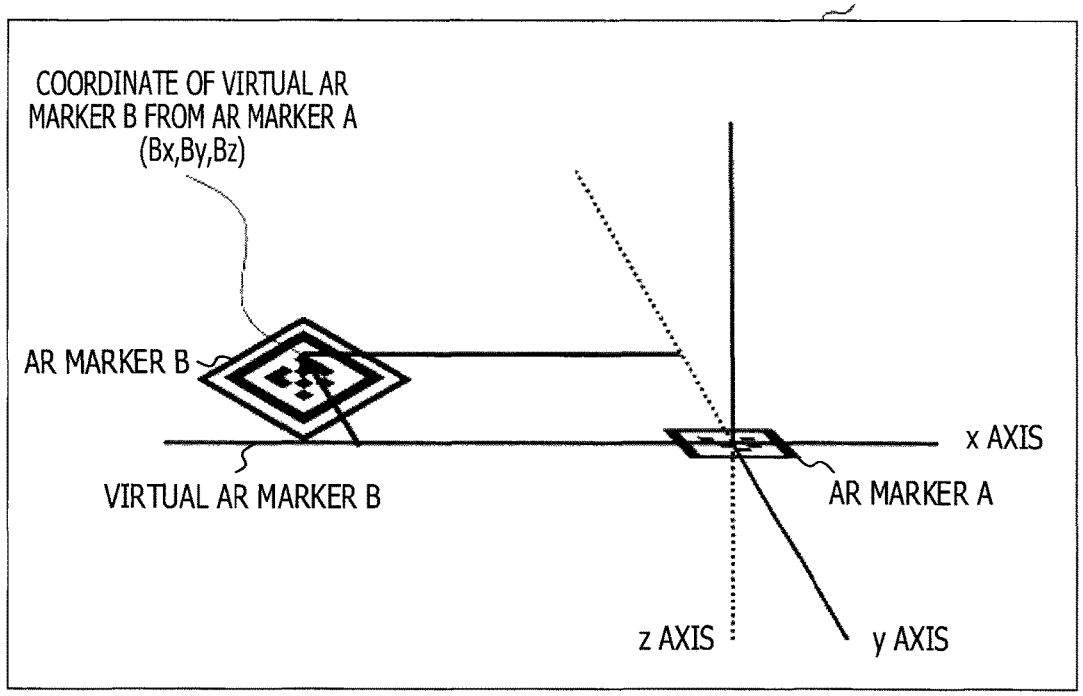
FIGS. 12A and 12B are diagrams illustrating (first) examples in which a virtual AR marker is defined according to the embodiment.

As illustrated in FIG. 12A, the virtual AR marker generation unit 25-1 sets the AR marker A to a reference AR marker, acquires the coordinate of the AR marker B on the screen based on the coordinate system of the AR marker A, and dynamically generates a virtual AR object as a virtual AR marker B in the position. Meanwhile, in the example of FIG. 12A, a virtual marker B is illustrated as large compared to the size of the actual AR marker B for convenience. However, actually, the virtual marker B is defined in a size which is seen as the same as the actual AR marker B on the screen.

Figure 12B:
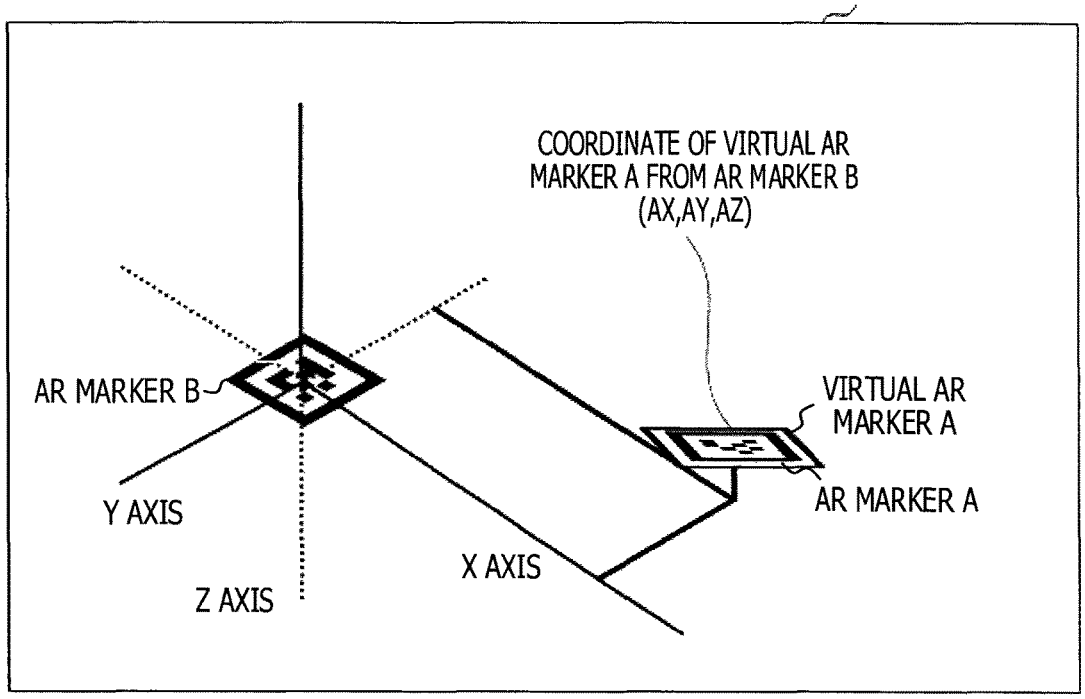

In addition, as illustrated in FIG. 12B, the virtual AR marker generation unit 25-1 sets the AR marker B to a reference AR marker, acquires the coordinate of the AR marker A on the screen based on the coordinate system of the AR marker B, and dynamically generates a virtual AR object as a virtual AR marker A in the position. Meanwhile, in the example of FIG. 12B, a virtual AR marker A is also illustrated as large compared to the size of the actual AR marker A for convenience.

Meanwhile, as illustrated in FIGS. 12A and 12B, pieces of virtual AR marker identification information which are mutually defined in the respective AR markers A and B or the three-dimensional coordinates (relative coordinates) of the virtual AR markers from the AR markers are stored in the virtual AR marker DB 30-3.

Figure 13A:
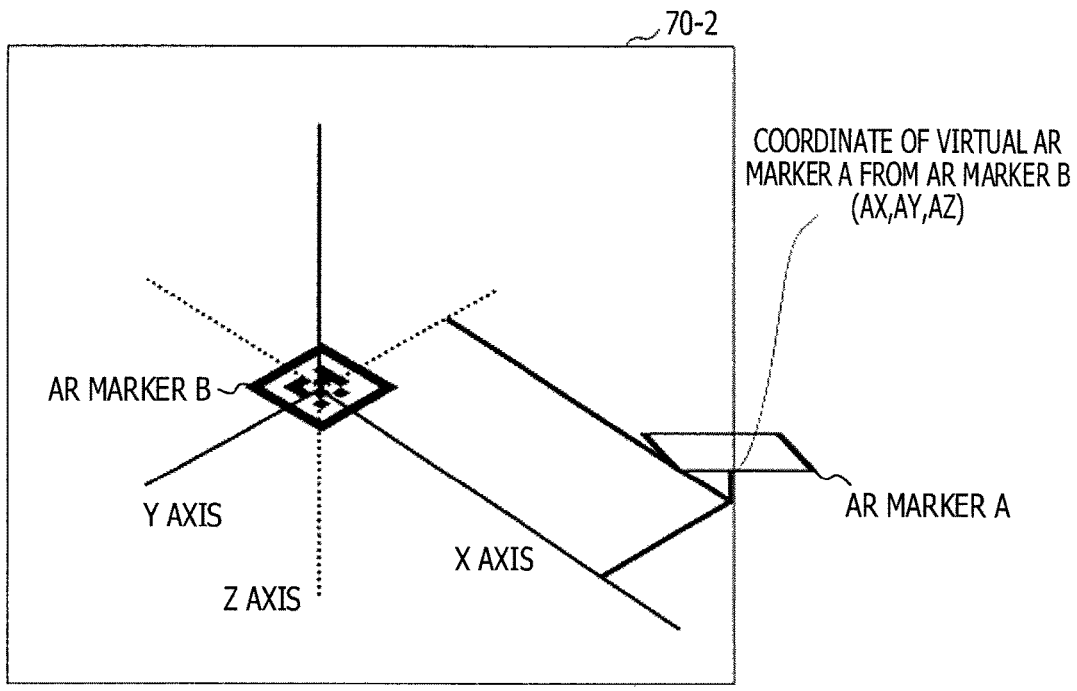
FIGS. 13A and 13B are diagrams illustrating (second) examples in which the virtual AR marker is defined according to the embodiment.
Figure 13B:
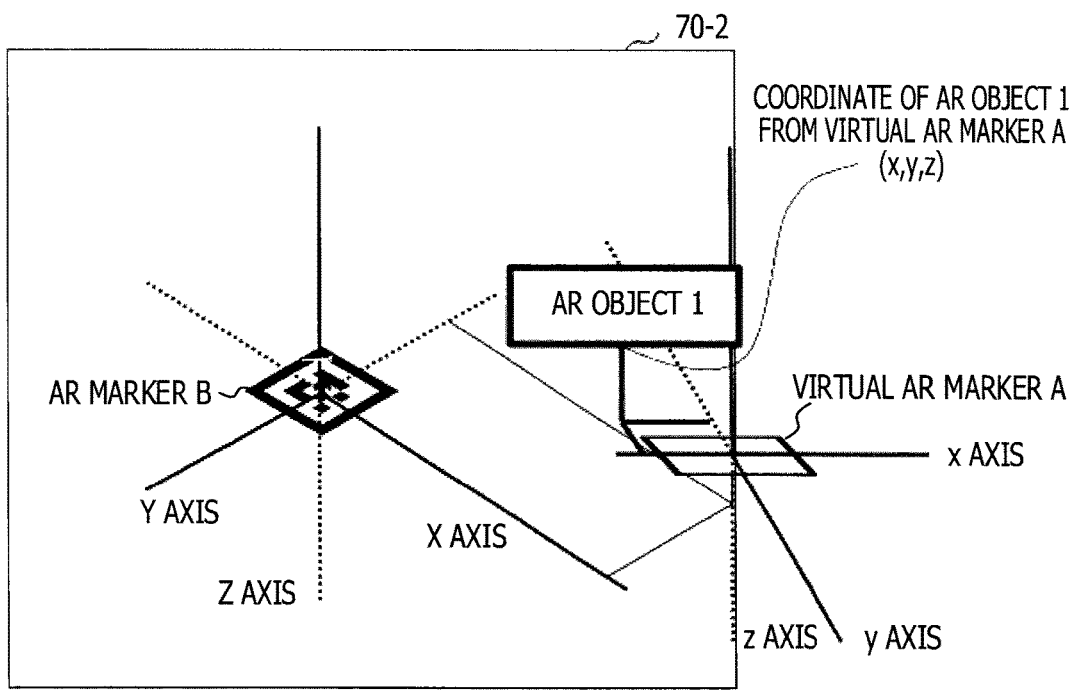

Here, when the AR marker A is not reflected in an image 70-2 (when the AR marker A is not recognized), the virtual AR marker recognition unit 25-2 constructs an AR marker A coordinate system (x, y, z) based on the virtual AR marker A which is associated with the AR marker B, as illustrated in FIGS. 13A and 13B. In addition, the virtual AR marker recognition unit 25-2 may acquire an AR object which is associated with the AR marker A from the virtual AR marker DB 30-3, and may display the acquired AR object 1.

For example, as illustrated in FIG. 13A, if the AR marker A is not reflected in the image 70-2, the virtual AR marker recognition unit 25-2 acquires the relative coordinate of the virtual AR marker A based on the AR marker B with reference to the virtual AR marker DB 30-3. In addition, correction is added to the display position based on the distortion of the AR marker. Therefore, in the coordinate system of the AR marker B, it is possible to acquire the coordinates and the shape of the virtual AR marker A.

In addition, for example, as illustrated in FIG. 13B, in the coordinate system of the virtual AR marker A, a position is specified by acquiring the coordinate information of the AR object which is associated with the AR marker A1, and thus the AR object 1 is superimposedly displayed in the specified position.

Figure 14A:
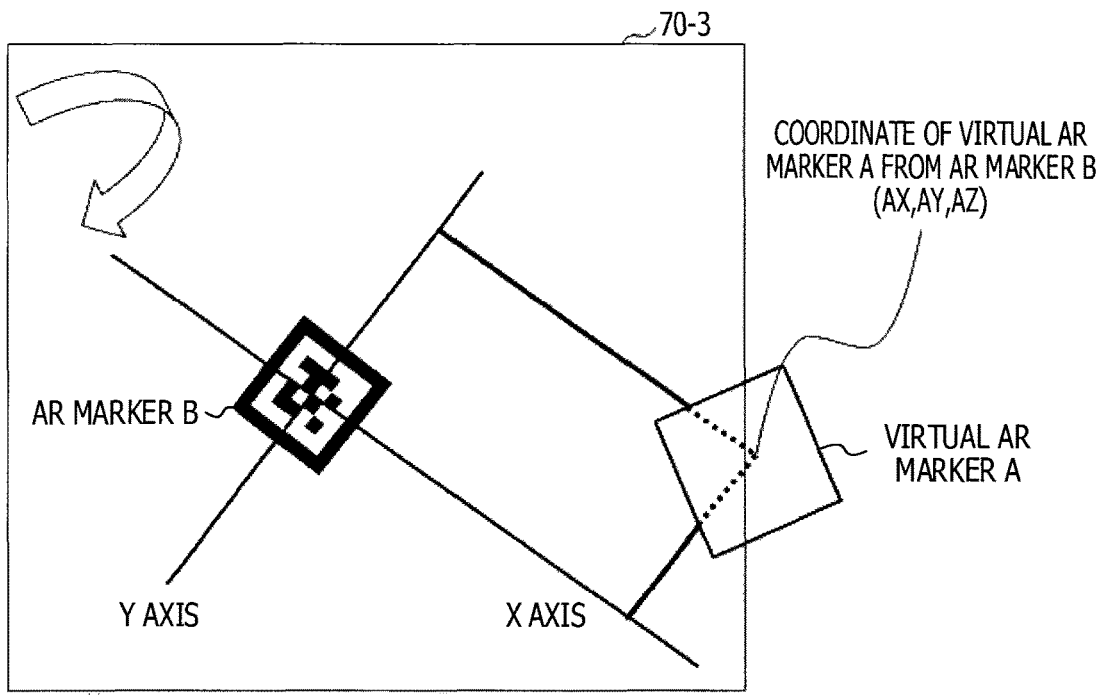
FIGS. 14A and 14B are diagrams illustrating (third) examples in which the virtual AR marker is defined according to the embodiment.
Figure 14B:
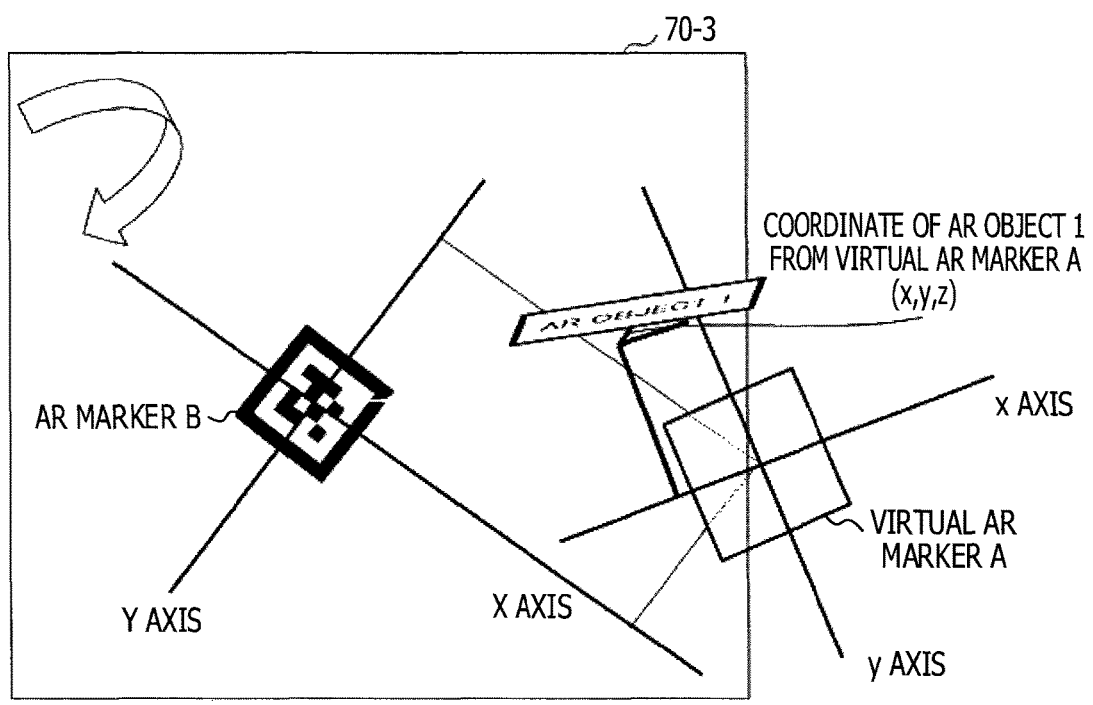

In addition, FIGS. 14A and 14B illustrate a captured image 70-3 which is acquired by changing the photographing direction of the image 70-2 in FIGS. 13A and 13B. As illustrated in FIGS. 14A and 14B, it is possible to calculate projection information which is to be used for enlargement and reduction from the size of the virtual AR marker A. The reason for this is that the original shape and size of the virtual AR marker A are the same as those of an actual AR marker A and that the shape (square) and the size (for example, one side thereof is approximately 2 to 5 cm) of the actual AR marker A are already defined. Therefore, when the information is used, it is possible to acquire the projection information.

For example, in FIG. 14A, it is possible to acquire the reflection of the virtual AR marker A in the visual field the camera based on a coordinate from the AR marker and projection information about the AR marker B. In addition, in FIG. 14B, even if the AR marker A is not actually reflected in the camera, it is possible to understand how the AR marker A is captured by the imaging unit 21 (projection information) based on the coordinate of the virtual AR marker A and the distortion information for the coordinate. Therefore, it is possible to appropriately display the AR object 1 using the virtual AR marker A.

Here, in the related art, it is difficult to virtually define the AR marker as an AR object. The reason for this is that the AR marker has two functions, that is, "reference coordinate system" and "recognition of an AR marker ID based on a pattern". An AR object to be drawn in a coordinate system based on the AR marker is determined using the AR marker ID recognized based on the pattern. When it is difficult to detect the ID, an AR object to be drawn is not determined. That is, since it is desired to recognize a pattern using an AR marker in the actual space, it is difficult to virtually define in the AR space.

However, in the embodiment, in a situation in which a plurality of actual AR markers are simultaneously recognized in advance, it is possible to assign an ID which is recognized at the time point as virtual AR marker information. Therefore, the function of the marker to recognize the AR marker ID based on the pattern of the virtual AR marker is not desired, and thus it is possible to virtually define the AR marker ID.

As described above, according to the embodiment, even if a plurality of markers are not simultaneously recognized, it is possible to respectively display objects which are associated with the plurality of AR markers. In addition, it is not desired to simultaneously define the same object for the plurality of AR markers in the same manner.

For example, in an AR object display technology according to the related art, even if the relative coordinate of an AR object which is defined based on a certain AR marker is dynamically defined again based on another AR marker in a simple manner, enlargement and reduction or distortion (projection) information may be acquired from only the reference AR marker. However, in the embodiment, another AR marker is dynamically defined as a virtual AR marker (virtual AR object) to the coordinate system of a certain AR marker, and the distortion (projection) information of the virtual AR marker is applied. Therefore, it is possible to dynamically acquire the relative coordinate of the AR object based on an AR marker in the screen, and the relative coordinate of the AR object may not be defined based on the plurality of AR markers. Therefore, the embodiment may be used, for example, when distortion (projection) information is used in an offline environment.

In addition, in the embodiment, the AR marker ID (AR marker A) expressed by the virtual AR object may not be displayed on the screen again. In this case, a process may proceed to a process to acquire virtual AR marker distortion by the AR marker distortion detection unit 24 using only the AR marker ID and the display position information.

Example in which AR Object is Displayed According to Embodiment

Figure 15A:
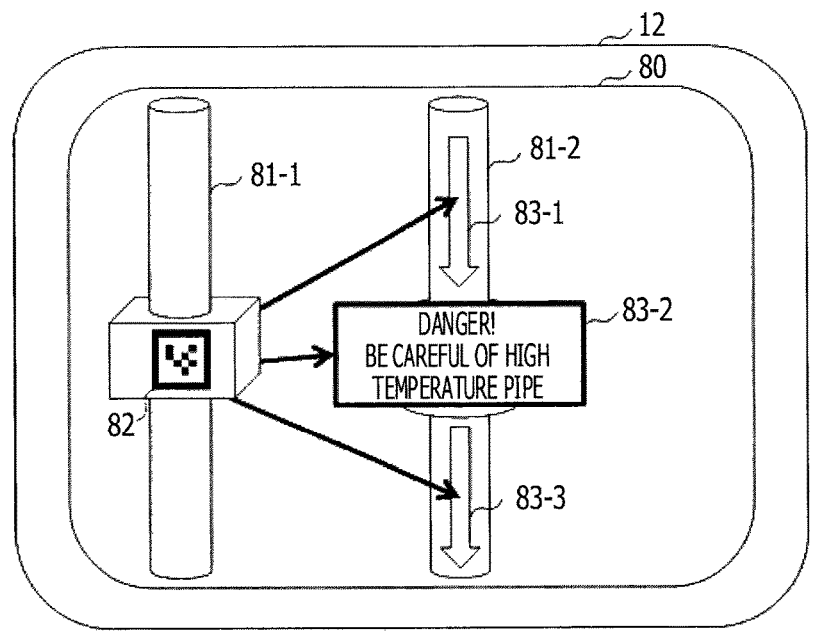
FIGS. 15A and 15B are diagrams illustrating examples in which an AR object is displayed.
Figure 15B:
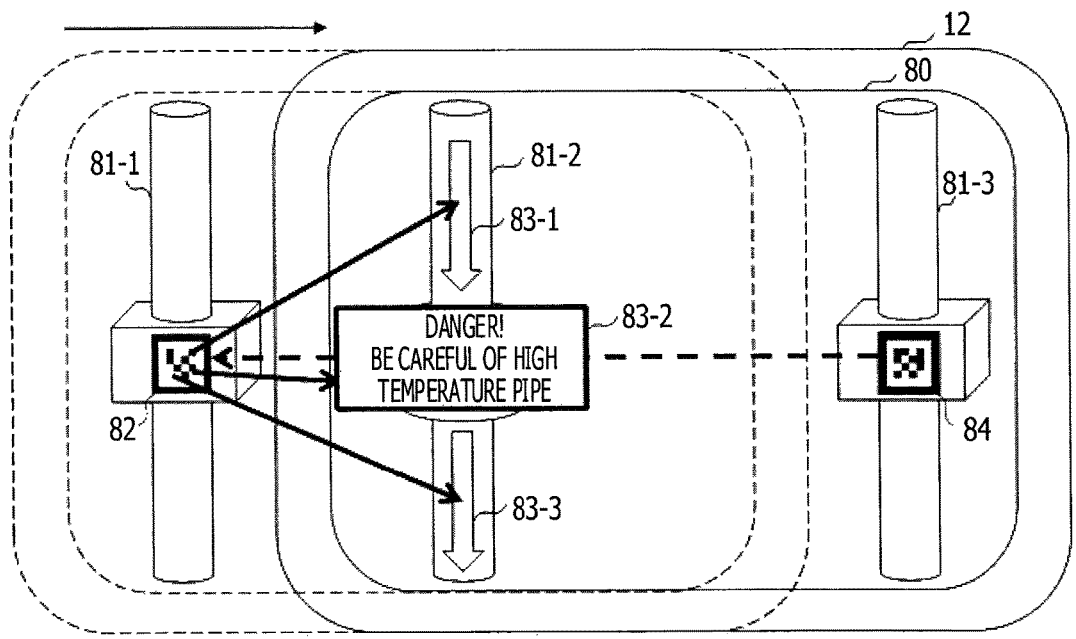

FIGS. 15A and 15B are diagrams illustrating examples in which AR objects are displayed. In the example of FIG. 15A, an image captured by the imaging unit 21 of the display apparatus 12 is displayed on a screen 80 of the display unit 28. Meanwhile, the image displayed on the screen 80 may be an image captured by an apparatus other than the display apparatus 12.

In the screen 80 illustrated in FIG. 15A, real objects 81-1 and 81-2, which are present in actual space, are captured. In the example of FIG. 15A, pipes are captured as examples of the real objects but the real objects are not limited thereto.

For example, the real object 81-2 is a high-temperature pipe and a user in the vicinity of the real object 81-2 knows that the real object 81-2 is dangerous. In this case, an AR marker 82 is arranged in the vicinity of the real object 81-2, and AR objects 83-1 to 83-3 are displayed in relative coordinates to the real object 81-2 from the AR marker 82. Meanwhile, in the example of FIG. 15A, since the real object 81-2, which is a target on which the AR objects are displayed, is at a high temperature, it is difficult to actually attach the AR marker 82. Here, in the examples of FIG. 15A, the AR marker 82 is attached in another place (real object 81-1) which is close to the real object 81-2, and the AR objects 83-1 to 83-3, which call attention, are displayed in relative positions from the position of the AR marker 82.

In addition, in the embodiment, even if the AR marker 82 is not recognized, the above-described display process is performed such that the AR objects are displayed. When it is possible to recognize a plurality of AR markers (for example, AR markers 82 and 84) in the screen 80, each of the AR markers is defined as a virtual AR object (virtual AR marker).

Therefore, as illustrated in, for example, FIG. 15B, even if it is difficult to recognize the AR marker 82 from the screen 80 because the display apparatus 12 moves, the above-described AR objects 83-1 to 83-3 are displayed based on the positional information of the virtual AR marker (AR marker 82) from another marker (for example, AR marker 84) which is reflected in the screen 80.

Therefore, even if the AR marker 82 is not actually reflected in the camera, it is possible to draw the AR objects using the virtual AR marker which is on the outside of the screen based on the AR marker 84.

Display Process Performed when Three or More AR Markers are Recognized

In the above example, the example in which two AR markers are recognized has been illustrated. However, it is possible to perform the same process when three or more AR markers are recognized. For example, when three AR markers in a video captured by the imaging unit 21 are simultaneously recognized, the respective AR markers define other (counterpart) AR markers as virtual AR objects with regard to the respective AR markers (AR marker A, AR marker B, and AR marker C).

For example, the AR marker A defines the AR marker B and the AR marker C as a virtual AR marker object b and a virtual AR marker object c. In addition, in the same manner, the AR marker B defines the AR marker A and the AR marker C as a virtual AR marker object a and a virtual AR marker object c. In addition, the AR marker C defines the AR marker A and the AR marker B as the virtual AR marker object a and the virtual AR marker object b.

When the AR marker A is described as an example, distortion Xa is detected by the distortion detection unit 24 with regard to the AR marker A, which is acquired by the AR marker recognition unit 23, as described above. The videos of the AR marker B and the AR marker C are corrected using the distortion Xa (BXa, CXa). Therefore, if the AR marker A is planned and is captured at a reference distance, it is possible to grasp a way that the AR markers B and C are displayed on the screen.

Subsequently, the original size information Bs of the AR markers B and C is acquired using the AR marker DB 30-1. In addition, based on the corrected AR markers BXa and CXa and the original size information Bs, a way to rotate and arrange in a relative position from the AR marker A placed on the plan to match with the above-described AR markers BXa and CXa is understood. Therefore, the relative coordinate of the size information Bs based on the AR marker A is acquired, and thus it is possible to define the virtual AR objects b and c of the AR marker A. As a result, these pieces of information are maintained in the virtual AR marker DB 30-3 (for example, FIG. 9B).

In the same manner, with regard to the AR marker B, the AR markers A and C are defined as the virtual AR objects a and c based on the AR marker B. In addition, with regard to the AR marker C, the AR markers A and B are defined as the virtual AR objects a and b based on the AR marker C. These pieces of information are also maintained in the virtual AR marker DB 30-3 (for example, FIG. 9B).

Figure 16:
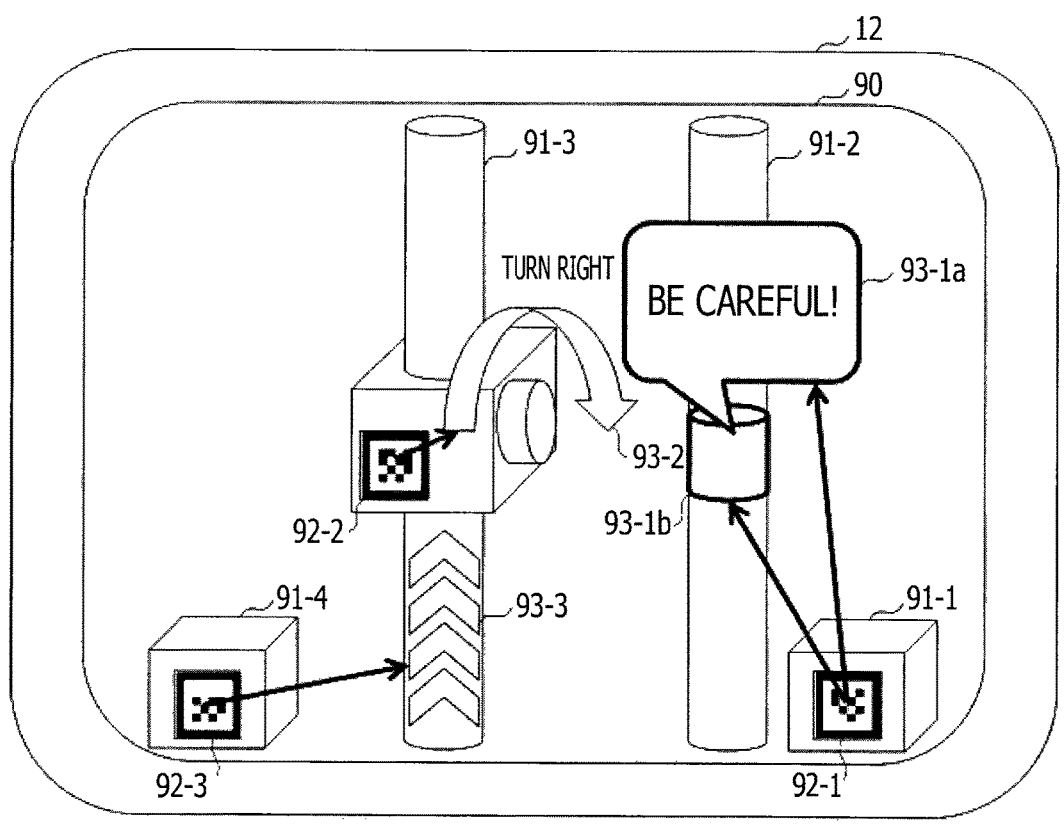
FIG. 16 is a diagram illustrating a display example when there are three AR markers.

FIG. 16 is a diagram illustrating a display example when there are three AR markers. In the example of FIG. 16, real objects 91-1 to 91-4 are present on a screen 90 in which a video captured by the display apparatus 12 is displayed. In addition, three AR markers 92-1 to 92-3 are present in the screen 90. Here, AR objects 93-1a and 93-1b are set to the AR marker 92-1. In addition, an AR object 93-2 is set to the AR marker 92-2, and an AR object 93-3 is set to the AR marker 92-3.

Figure 17A:
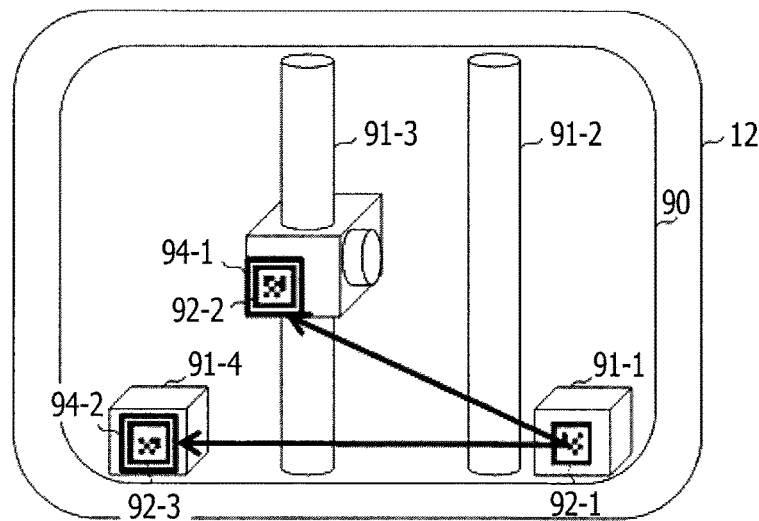
FIGS. 17A, 17B, and 17C are diagrams illustrating examples in which virtual AR markers are defined.
Figure 17B:
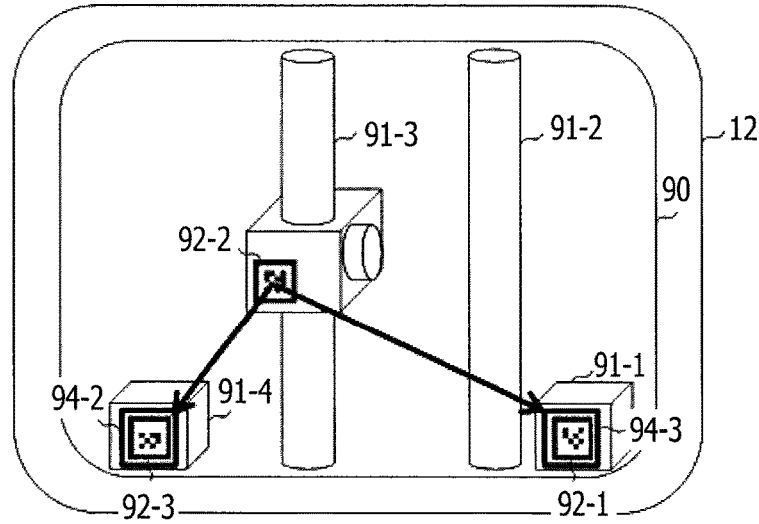
Figure 17C:
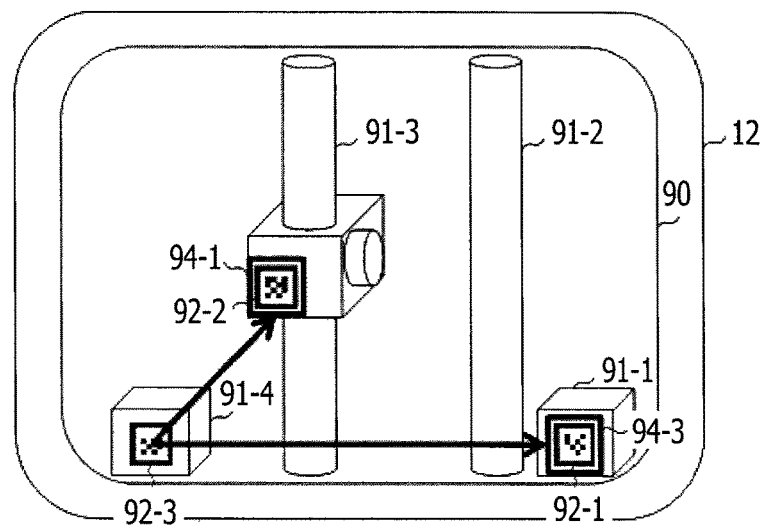

In such a case, as described above, virtual AR markers are respectively defined to the respective AR markers. FIGS. 17A to 17C are diagrams illustrating examples in which virtual AR markers are defined. Meanwhile, in examples of FIGS. 17A to 17C, respective AR objects 93 are not displayed for convenience of explanation.

In the example of FIG. 17A, the virtual AR marker generation unit 25-1 defines other AR markers 92-2 and 92-3 as the virtual AR objects with regard to the AR marker 92-1 (AR marker A). In addition, in the example of FIG. 17B, the virtual AR marker generation unit 25-1 defines other AR markers 92-1 and 92-3 as the virtual AR objects with regard to the AR marker 92-2 (AR marker B). In addition, in the example of FIG. 17C, the virtual AR marker generation unit 25-1 defines other AR markers 92-1 and 92-2 as the virtual AR objects with regard to the AR marker 92-3 (AR marker C).

Meanwhile, in FIGS. 17A to 17C, the respective virtual AR markers 94-1 to 94-3 are illustrated as large compared to the actual AR markers 92-1 to 92-3 for convenience. However, the respective virtual AR markers 94-1 to 94-3 are defined actually in the same sizes and the same distortion information as the AR markers 92-1 to 92-3 on the screen 90.

Subsequently, a display process, performed when it is difficult to recognize one of three AR markers after setting as described above is made, will be described. When AR markers are detected from a video captured by the imaging unit 21 or the like, the AR marker recognition unit 23 acquires AR marker IDs by referring to the patterns and pieces of size information (size) of the AR markers which are registered in advance with reference to the AR marker DB 30-1. In addition, the distortion detection unit 24 detects distortion by comparing AR marker images with pieces of the size information registered in the AR marker DB 30-1. The detected distortion information may be stored while being included in the size information for each AR marker or may be stored in the internal memory or the like.

Subsequently, when two AR markers are simultaneously recognized, a counterpart AR marker is temporally defined as a virtual AR object with regard to each of the AR markers (for example, AR marker A and AR marker B) instantly. However, when the virtual AR marker DB 30-3 is referred to, the virtual AR objects a and b are predefined for the AR marker A and the virtual AR objects a and c are predefined for the AR marker B, and thus a process to define virtual AR objects is not performed.

Subsequently, the display AR object determination unit 26 searches the virtual AR marker DB 30-3 based on the acquired AR marker ID. In addition, when a virtual AR object is defined based on the AR marker ID, it is checked whether or not an AR marker which has the same virtual AR marker ID corresponding to the virtual AR object is present on the same screen. Here, when the same AR marker is present on the screen, the virtual AR object is ignored. In addition, when the same AR marker is not present on the same screen, a process to recognize a virtual AR object as a virtual AR marker is performed. For example, the relative coordinate of the virtual AR object based on the AR marker is acquired by referring to the virtual AR marker DB 30-3 based on the AR marker ID. In addition, the display position of the acquired virtual AR object is corrected based on the distortion information. In addition, when the display position of the virtual AR object is included in the captured video, the virtual AR object is superimposedly displayed with a corrected shape.

The virtual AR marker recognition unit 25-2 recognizes the displayed virtual AR object (virtual AR marker). The display AR object determination unit 26 determines an AR object to be displayed by referring to the AR display object DB 30-2 based on the virtual AR object (virtual AR marker) ID. The AR object superimposition display unit 27 acquires relative coordinates from the AR marker with regard to each determined AR object, corrects the display position based on the AR marker distortion information, and superimposedly displays the AR object with a corrected shape.

Figure 18:
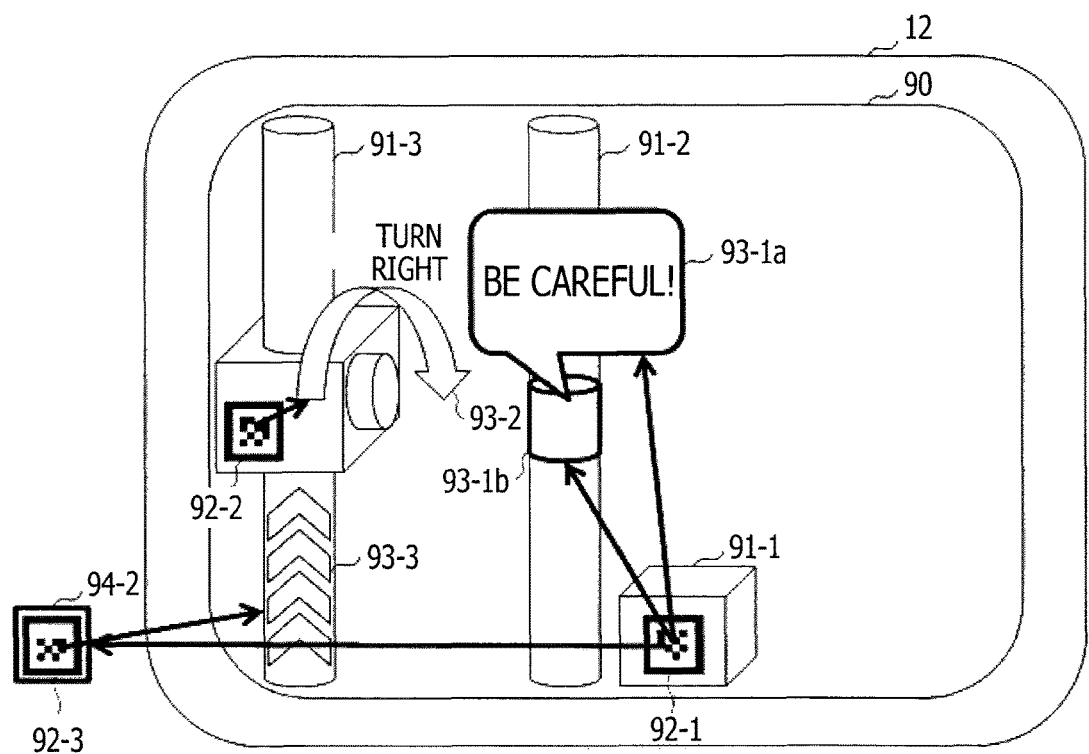
FIG. 18 is a diagram illustrating an example of an AR object which is finally displayed.

FIG. 18 is a diagram illustrating an example of an AR object which is finally displayed. In the example of FIG. 18, even if it is difficult to recognize the AR marker 92-3 from the screen 90 from the state illustrated in FIG. 16, it is possible to display the AR object 93-3 corresponding to the virtual AR marker 94-2 using the virtual AR marker 94-2 which is defined as an AR marker (for example, AR marker 92-1) which may be recognized from the screen 90.

In addition, in the screen 90 illustrated in FIG. 18, the AR marker 92-2 is displayed. Therefore, the AR object 93-3 may be displayed using the virtual AR marker 94-2 which is defined in the AR marker 92-2 which may be recognized from the screen 90. Meanwhile, in order to keep the AR object 93-3 away from being superimposedly displayed with both the AR markers 92-1 and 92-2, control may be performed according to the priority of the AR markers such that the AR object 93-3 is displayed using any one of the AR markers.

In addition, in the example of FIG. 18, it is possible to display the AR object 93-2 using the AR marker 92-2, and thus the virtual AR marker 94-1 corresponding to the AR marker 92-2 is not displayed.

Therefore, it is possible to realize an appropriate display process. Meanwhile, in the embodiment, when the above-described AR object is displayed, there is, for example, an AR object, such as "precautions", which is desired to be regularly displayed. In such a case, an item such as "regular display" may be added to the AR display object DB 30-2 or the like in advance. When an AR object is displayed through a virtual AR marker, the AR object may be displayed only when the item "regular display" is checked.

As described above, according to the embodiment, it is possible to display an object which is associated with a non-recognized AR marker (reference object) in an appropriate position. For example, according to the embodiment, even in a state in which it is difficult to recognize an AR marker, it is possible to display an object which is associated with the AR marker in an appropriate position.

In addition, according to the embodiment, even if a plurality of AR markers are not simultaneously recognized, it is possible to display objects which are associated with the plurality of respective AR markers. For example, when it is difficult to recognize a reference AR marker, it is possible to continue to display AR objects. For example, according to the embodiment, it is possible to control the content of display performed according to the recognition of an AR marker based on the arrangement situation of the AR markers. In addition, according to the embodiment, it is not desired to simultaneously define the same object to a plurality of AR markers in the same manner.

As above, examples have been described. However, the examples are not limited to the specified embodiment and various alternation and modifications are possible without departing from the scope disclosed in claims. In addition, it is possible to combine a part or all of the above-described examples.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A system, comprising:
    circuitry configured to:
        detect a first object and a second object from a first image captured by an electronic device, wherein the first object is different from the second object and the first object has a different planar orientation from the second object;
        generate positional relationship information between the first object and the second object, and distortional relationship information regarding a second shape of the second object in the first image with reference to a first shape of the first object in the first image;
        store, into a memory, the positional relationship information and the distortional relationship information associated with a combination of the first object and the second object;
        detect the first object and a third object from a second image captured by the electronic device, wherein the second object is not detected from the second image;
        generate other positional relationship information between the first object and the third object, and other distortional relationship information regarding a third shape of the third object in the second image with reference to a fourth shape of the first object in the second image;
        store, into the memory, the other positional relationship information and the other distortional relationship information associated with a combination of the first object and the third object;
        acquire a third image captured by the electronic device;
        specify a position and a distortion of the third object in the third image when the third object is detected from the third image; and
        control a display to display a content associated with the second object based on the position, the distortion, the positional relationship information, the distortional relationship information, the other positional relationship information, and the other distortional relationship information when the first object and the second object are not detected from the third image, the content being superimposed on the third image.

2. The system according to claim 1, wherein the circuitry is configured to:
    estimate another position of the second object which is not detected from the third image based on the position, the distortion, the positional relationship information, the distortional relationship information, the other positional relationship information and the other distortional relationship information, and
    determine a specific position based on the another position, the content being superimposed on the third image at the specific position.

3. The system according to claim 1, wherein the circuitry is configured to control the display to display another content associated with the third object on the third image based on the position and the distortion, the another content being superimposed on the third image at another specific position with respect to the third object.

4. The system according to claim 1, wherein the other positional relationship information and the other distortional relationship information are deleted when a standard time has elapsed from storing of the other positional relationship information and the other distortional relationship information.

5. The system according to claim 1, wherein the distortional relationship information is generated based on a first difference between the first shape and an undistorted shape of the first object, and a second difference between the second shape and another undistorted shape of the second object.

6. The system according to claim 1, wherein the first object and the second object are markers having at least one of a specific shape or pattern.

7. The system according to claim 1, further comprising:
    the electronic device, wherein the electronic device includes
        an image pickup device configured to capture the first image and the second image; and
        a communication interface configured to send the first image and the second image to the system via a network and receive information from the system via the network.

8. The system according to claim 1, further comprising:
    the electronic device, wherein the electronic device includes the display configured to display the content.

9. The system according to claim 1, wherein the system is a server.

10. The system according to claim 9, wherein the server includes
the circuitry; and
a communication interface configured to receive the first image and the second image from the electronic device via a network and transmit the content to the electronic device via the network.

11. The system according to claim 1, wherein when the second object is not detected in the second image, the circuitry is further configured to
adjust original content, associated with the second object, based on the position, the distortion, the positional relationship information, and the distortional relationship information, to generate the content,
associate the content with the second object, and
control the display to display the content.

12. A display control method executed by a circuitry, the display control method comprising:
detecting a first object and a second object from a first image captured by an electronic device, wherein the first object is different from the second object and the first object has a different planar orientation from the second object;
generating positional relationship information between the first object and the second object, and distortional relationship information regarding a second shape of the second object in the first image with reference to a first shape of the first object in the first image;
storing, into a memory, the positional relationship information and the distortional relationship information associated with a combination of the first object and the second object;
detecting the first object and a third object from a second image captured by the electronic device, wherein the second object is not detected from the second image;
generating other positional relationship information between the first object and the third object, and other distortional relationship information regarding a third shape of the third object in the second image with reference to a fourth shape of the first object in the second image;
storing, into the memory, the other positional relationship information and the other distortional relationship information associated with a combination of the first object and the third object;
acquiring a third image captured by the electronic device;
specifying a position and a distortion of the third object in the third image when the third object is detected from the third image; and
controlling a display to display a content associated with the second object based on the position, the distortion, the positional relationship information, the distortional relationship information, the other positional relationship information, and the other distortional relationship information when the first object and the second object are not detected from the third image, the content data being superimposed on the third image.

13. The display control method according to claim 12, further comprising:
estimating another position of the second object which is not detected from the third image based on the position, the distortion, the positional relationship information, the distortional relationship information, the other positional relationship information and the other distortional relationship information; and determining a specific position based on the another position, the content being superimposed on the third image at the specific position.

14. The display control method according to claim 12, further comprising:
controlling the display to display another content associated with the third object on the third image based on the position and the distortion, the another content being superimposed on the third image at another specific position with respect to the third object.

15. The display control method according to claim 12, wherein the other positional relationship information and the other distortional relationship information are deleted when a standard time has elapsed from storing of the other positional relationship information and the other distortional relationship information.

16. The display control method according to claim 12, wherein the distortional relationship information is generated based on a first difference between the first shape and an undistorted shape of the first object, and a second difference between the second shape and another undistorted shape of the second object.

17. The display control method according to claim 12, wherein the first object and the second object are markers having at least one of a specific shape or pattern.

18. The display control method according to claim 12, further comprising, when the second object is not detected in the second image:
adjusting original content, associated with the second object, based on the position, the distortion, the positional relationship information, and the distortional relationship information, to generate the content;
associating the content with the second object; and
controlling the display to display the content.

19. A non-transitory computer-readable storage medium storing a program which, when executed by a circuitry, causes the circuitry to:
detect a first object and a second object from a first image captured by an electronic device, wherein the first object is different from the second object and the first object has a different planar orientation from the second object;
generate positional relationship information between the first object and the second object, and distortional relationship information regarding a second shape of the second object in the first image with reference to a first shape of the first object in the first image;
store, into a memory, the positional relationship information and the distortional relationship information associated with a combination of the first object and the second object;
detect the first object and a third object from a second image captured by the electronic device, wherein the second object is not detected from the second image;
generate other positional relationship information between the first object and the third object, and other distortional relationship information regarding a third shape of the third object in the second image with reference to a fourth shape of the first object in the second image;
store, into the memory, the other positional relationship information and the other distortional relationship information associated with a combination of the first object and the third object;
acquire a third image captured by the electronic device;

specify a position and a distortion of the third object in the third image when the third object is detected from the third image; and control a display to display a content associated with the second object based on the position, the distortion, the positional relationship information, the distortional relationship information, the other positional relationship information, and the other distortional relationship information when the first object and the second object are not detected from the third image, the content data being superimposed on the third image.

20. The non-transitory computer-readable storage medium according to claim 19, wherein when the second object is not detected in the second image, the circuitry is further caused to adjust original content, associated with the second object, based on the position, the distortion, the positional relationship information, and the distortional relationship information, to generate the content, associate the content with the second object, and control the display to display the content.

\* \* \* \* \*